US006921789B2

(12) United States Patent
Booth et al.

(10) Patent No.: US 6,921,789 B2
(45) Date of Patent: Jul. 26, 2005

(54) SYNTHETIC THERMOPLASTIC COMPOSITION, ARTICLES MADE THEREFROM AND METHOD OF MANUFACTURE

(75) Inventors: Jess R. Booth, Newport Beach, CA (US); Yoram Aisenberg, Fort Lauderdale, FL (US)

(73) Assignee: Hi-Tech Environmental Products, LLC, Santa Ana, CA (US)

( * ) Notice: Subject to any disclaimer, the term of this patent is extended or adjusted under 35 U.S.C. 154(b) by 19 days.

(21) Appl. No.: 10/036,159

(22) Filed: Dec. 26, 2001

(65) Prior Publication Data

US 2003/0069342 A1 Apr. 10, 2003

Related U.S. Application Data

(63) Continuation-in-part of application No. 09/322,211, filed on May 28, 1999, now abandoned.

(51) Int. Cl.$^7$ ............................................... C08K 3/13
(52) U.S. Cl. ...................................................... 524/430
(58) Field of Search ........................................... 524/430

(56) References Cited

U.S. PATENT DOCUMENTS

| | | | | |
|---|---|---|---|---|
| 3,843,591 | A | * 10/1974 | Hedrick et al. | ................ 260/37 |
| 4,347,174 | A | 8/1982 | Nagase et al. | ............... 523/116 |
| 5,109,051 | A | 4/1992 | Kroenke et al. | ............. 524/444 |
| 5,492,741 | A | * 2/1996 | Akao et al. | ................. 428/35.2 |
| 5,667,842 | A | 9/1997 | Larson et al. | ................ 427/258 |
| 2002/0198121 | A1 | 12/2002 | Nitzsche | |

FOREIGN PATENT DOCUMENTS

| | | |
|---|---|---|
| DD | 292 007 A | 7/1991 |
| WO | WO 00/73370 | 12/2000 |

OTHER PUBLICATIONS

Database WPI, Section Ch, Week 198601, Derwent Publications Ltd., London, GB; Class A60, AN 1986–004356, XP002117528 & JP 60 0231729A (Asahi Chem Ind Co Ltd), Nov. 18, 1985 abstract.*

Database WPI, Section Ch, Week 198601, Derwent Publications Ltd., London, GB; Class A60, AN 1986–004356, XP002147528 & JP 60 231729A (Asahi Chem Ind Co Ltd), Nov. 18, 1985 abstract.

Database WPI, Section Ch, Week 1999348, Derwent Publications Ltd., London, GB; Class A12, AN 1993–384145, XP002147529 & SU 1 775 428 A (Kamen I Silikaty Res Prodn Assoc), Nov. 15, 1995 abstract.

K. Lakdawala and R. Salovey, "Rheology of Polymers Containing Carbon Black", Polymer Engineering and Science, vol. 27, No. 14, 1035–1042 (1987).

K. Lakdawala and R. Salovey, "Rheology of Copolymers Containing Carbon Black", Polymer Engineering and Science, vol. 27, No. 14, 1043–1049 (1987).

L. Nuel and M.M. Denn, "Effect of Processing and Particulate Fillers on the Rheology of a Nematic Polymer Melt", Rheologica Acta 30, 65–70 (1991).

* cited by examiner

*Primary Examiner*—Peter D. Mulcahy
(74) *Attorney, Agent, or Firm*—Fulbright & Jaworski L.L.P.

(57) ABSTRACT

New plastic compositions, made from a uniform mixture of thermoplastic resin and a naturally occurring aluminosilicate glass (NOAG) produce articles of manufacture by a variety of molding processes that have a more uniform and smoother surface with significantly reduced sink marks, and exhibit an improved dispersion of additives and pigments. The molding machines making articles from these compositions of thermoplastic resin and NOAG exhibit an increase in throughput, lower operating temperatures, less power consumption, reduced injection pressure, and increased injection speed. Running these synthetic plastic compositions through injection, extrusion and blow molding machines also tends to clean and lubricate the screw and the injector nozzles, increasing the life of the machine parts. The NOAG is preferably present in amounts ranging from 0.1% to 3.0% by weight of the composition. The NOAG is added to the thermoplastic resin in a manner that uniformly disperses it throughout the resulting thermoplastic resin-NOAG composition. The NOAG may be added as a dry powder directly to the plastic resin preferably in a particle size smaller than 325 mesh. The NOAG also may be added to the plastic resin in pellet form of various sizes, encapsulated by a carrier such as LLDPE, or may be directly compounded into the thermoplastic resin.

26 Claims, 15 Drawing Sheets

THERMOPLASTIC: PVC
1% NOAG ADDED

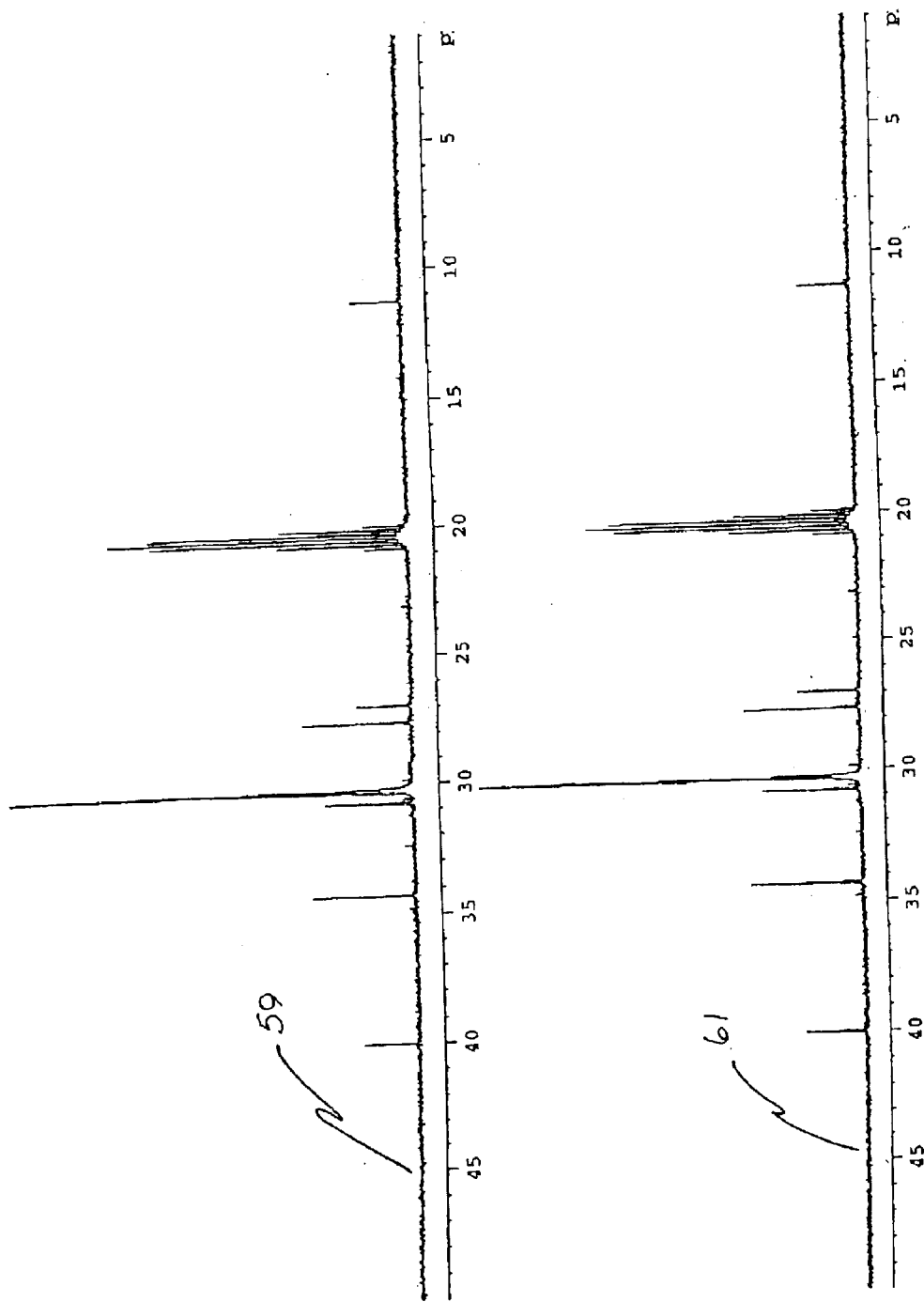
FIGURE 14 C^13 NMR SPECTRA

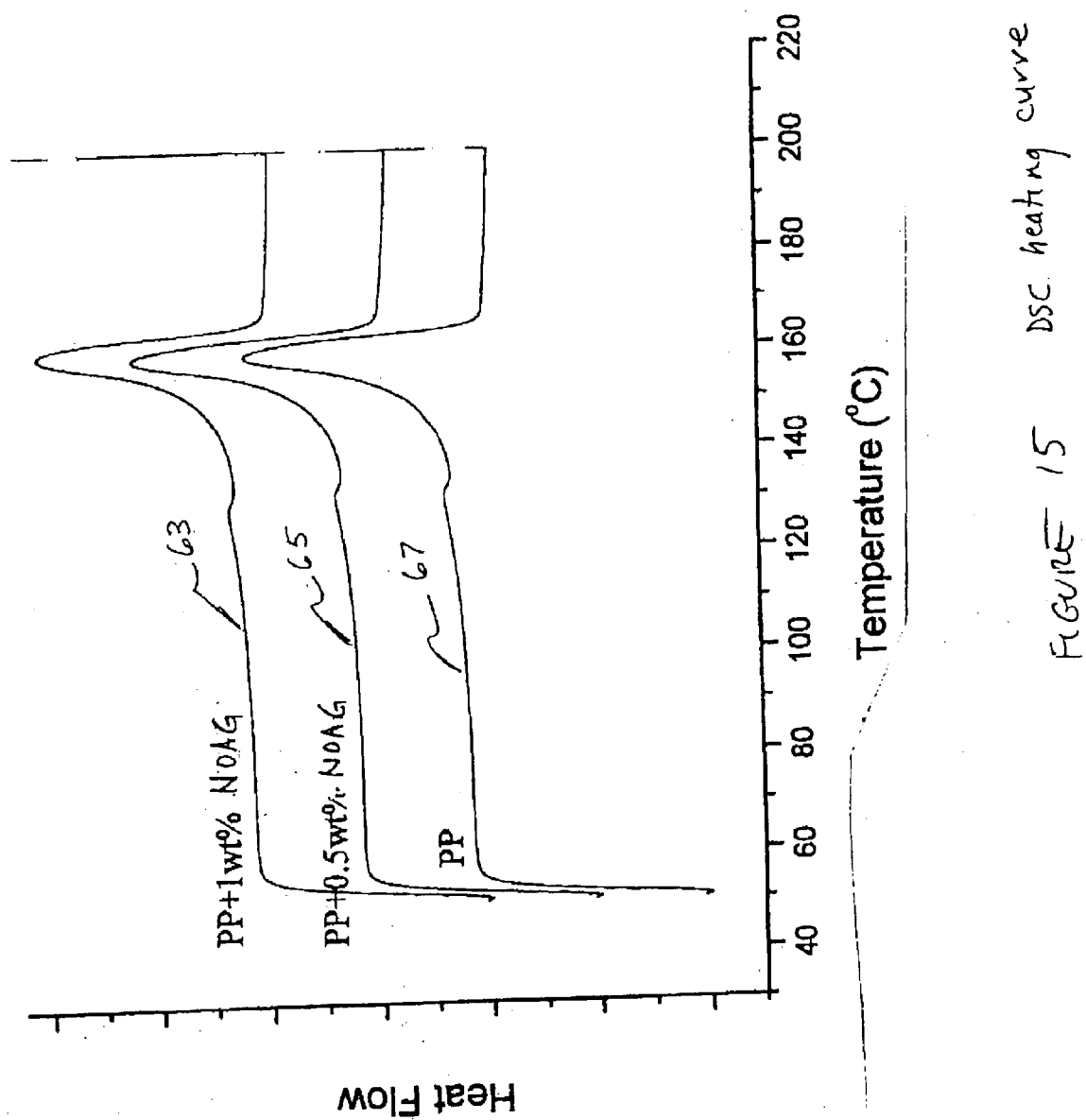
FIGURE 15  DSC heating curve

SYNTHETIC THERMOPLASTIC COMPOSITION, ARTICLES MADE THEREFROM AND METHOD OF MANUFACTURE

CROSS REFERENCE TO RELATED APPLICATION

This application is a continuation-in-part of application Ser. No. 09/322,211 filed May 28, 1999 now abandoned for Synthetic Thermoplastic Compositions, Articles Made Therefrom And Method of Manufacture.

BACKGROUND OF THE INVENTION

1. Field of the Invention

The present invention relates generally to improvements in synthetic thermoplastic compositions, articles made from such synthetic thermoplastic compositions and methods of making articles.

2. Description of Related Art

Plastics are moldable chemically-fabricated (synthetic) materials derived mostly from fossil fuels, such as oil, coal or natural gas. The long molecules in plastics are composed of carbon atoms linked into chains. One type of plastic, polyethylene, is composed of extremely long molecules, each containing over 200,000 carbon atoms. These long molecule chains give plastics unique properties and distinguish plastics from materials such as metals that have crystalline structures. Fossil fuels contain hydrocarbons, which provide the building blocks for long polymer molecules. The building blocks called monomers link together to form long carbon chains called polymers. The process of forming these long molecules from hydrocarbons is called polymerization. The molecules typically form viscous sticky substances known as resins which are the materials used to make plastic products or articles by heating the resins to their specific melting range and molding them into articles by various methods.

The carbon backbone of polymer molecules often bond with smaller side chains consisting of other elements, including chlorine, fluorine, nitrogen and silicon, for example. These side chains give plastics distinguishing characteristics. For example, when chlorine atoms substitute for hydrogen atoms along the carbon chain, the result is polyvinyl chloride, one of the most versatile and widely used plastics in the world. The addition of chlorine makes this plastic harder and more resistant. The advantages and disadvantages of different plastics are associated with the unique chemistry of each plastic which determines the physical, mechanical and thermal properties of the molded article.

All plastics can be basically divided into two groups: thermoplastic and thermosetting plastic. The two groups differ in the way that each responds to heat. Thermoplastics can be repeatedly softened by heating, and hardened by cooling. Thermosetting plastics harden permanently after being heated once. The present invention is concerned with the thermoplastic family of plastics.

Examples of commonly used thermoplastics are: polyethylene (PE), polyvinyl chloride (PVC), polypropylene (PP), polystyrene (PS), polyethylene terephthalate (PET), acrylonitrile butadiene styrene (ABS), polymethyl methacrylate (PMMA), polyamide (PA) and polycarbonate (PC). In addition, many variations and hybrid engineered resins based on these are in use today.

The process of forming plastic resins into products is the basis of the plastics industry. Many different processes can be used to make products from thermoplastics. Some of the more common of these processes are injection molding, extrusion molding, blow molding, injection blow molding, blow film extrusion, calendaring, thermoforming, casting and expansion processes. In all these processes, the plastic must be softened or sufficiently liquefied in order to allow the resin to flow and create the shape of the article. For convenience, all these plastic resin forming processes will be simply referred to as "molding process" hereinafter.

Because of the importance of thermoplastics to the production of consumer products, and the great number of consumer products made from thermoplastics, the industry is continually searching for ways to improve both the plastic resin systems, and the manner in which an article is made. Specifically, the plastics industry wants to create articles that have specified chemical and physical strengths, that have better color dispersion, and have improved surface smoothness and texture. The industry is also constantly searching for molding process improvements that reduce:

(a) cycle time, the amount of time needed to produce each article;

(b) cure time, the amount of time needed after molding for the article to be sufficiently hard to be handled;

(c) energy consumption per article, and (d) operating temperature, for both energy conservation and prevention of polymer degradation.

SUMMARY OF THE INVENTION

The present invention is directed to a composition of thermoplastic resin and a vitreous material uniformly dispersed therein in a quantity of less than about 2% by weight of the composition severally as a composition, articles made from the composition and methods of making articles from the composition. The addition of the material enhances a large range of molding processes.

In several separate aspects of the presept invention, the material is contemplated to include any of:

aluminosilicate;

a vitreous, naturally occurring formulation including silicon dioxide and aluminum oxide;

silicon dioxide and aluminum oxide; or at least 10% by weight of silicon dioxide and at least 10% by weight of aluminum oxide;

In a further separate aspect of the present invention, any of the foregoing aspects may include thermoplastic resin selected from a group consisting of polyethylene, polyvinyl chloride, polypropylene, polystyrene, polyethylene terephthalate, acronytril butadiene styrene, polymethyl methacrylate, polyamide or polycarbonate.

In yet a further separate aspect of the present invention, any of the foregoing separate aspects are contemplated to be employed in combination to greater advantage.

Accordingly, it is an object to provide an improved thermoplastic resin as composition, article of the composition and method of making articles of the composition with enhanced mold processing. Other and further objects and advantages will appear hereinafter.

BRIEF DESCRIPTION OF THE DRAWINGS

The exact nature of this invention, as well as its objects and its advantages, will become readily appreciated upon consideration of the following detailed description in relation to the accompanying drawings, in which like reference numerals designate like parts throughout the figures thereof and wherein:

FIG. 14 is a $C^{13}$ nuclear magnetic resonance spectroscopic analysis of LLDPE compounded with NOAG; and FIG. 15 is a differential scanning calorimetry analysis of polypropylene compounded with NOAG.

DETAILED DESCRIPTION OF THE PREFERRED EMBODIMENTS

The present embodiment is a mixture of a naturally occurring aluminosilicate glass (NOAG) and a thermoplastic resin. Any one of the many well known and readily available thermoplastic resins may be utilized, chosen on the basis of the physical and mechanical properties desired for the molded plastic article.

The inventors conducted tests with various NOAG-thermoplastic resin compositions using various molding machines. A variety of molding processes were utilized for these tests based on what manufacturing machines were made available to the inventors. The various NOAG-thermoplastic resin compositions were run on conventional injection molding machines, such as a 700 ton Cincinnati Milacron machine, as well as blow molding, extrusion molding and structural foam machines. The range of articles produced by these molding processes using the NOAG-thermoplastic resin composition included water buckets, bottles, water faucets, milk crates, pill boxes, plastic film, shipping pallets, and railroad ties.

Figure 1:
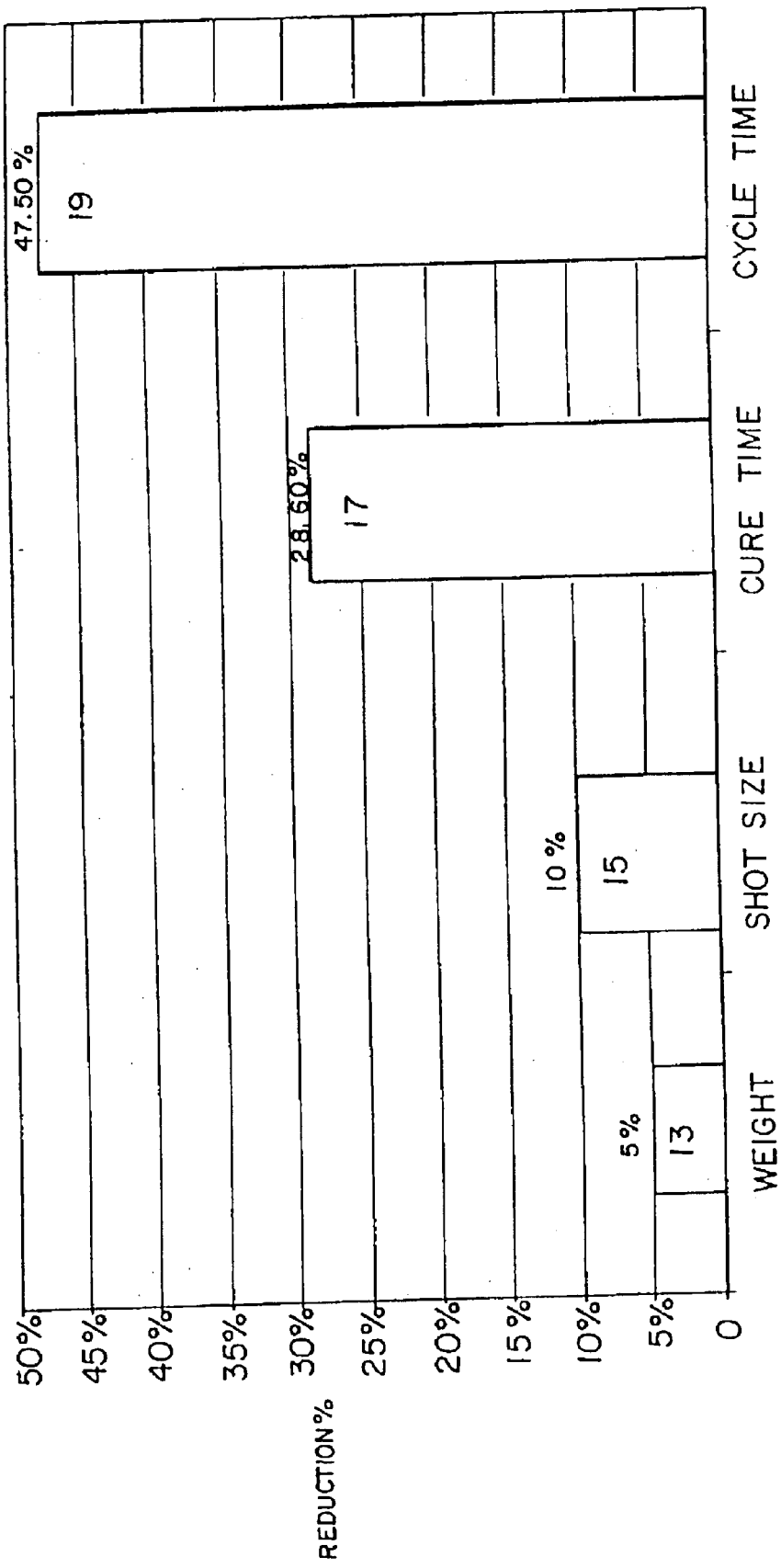
FIG. 1 is a chart showing the processing advantages to using NOAG with polypropylene.

FIG. 1 is a chart illustrating the results of a test using NOAG-polypropylene resin composition to mold an article. Percentage reduction on the Y axis 11 is plotted against the variables of weight, shot size, cure time and cycle time of articles being produced, on the X axis 12. The composition utilized for producing the injection molded articles is the polypropylene resin with NOAG at a quantity of 1% by weight of the composition. The NOAG-polypropylene resin composition was used in an injection molding machine to make perfume bottle caps. The articles made from the NOAG-polypropylene resin were compared against a baseline of parts made from the virgin resin alone. As shown in the chart of FIG. 1, the test results were: the end product weight 13 was reduced by 5%, the volume of plastic that was needed to make the product, the shot size 15, was reduced by 10%, the amount of time that was required to cool the product after the material was injected into the mold, the cure time 17, was reduced by 28.6%, and the overall cycle time 19 for making each article was reduced by 47.5%.

Figure 9:
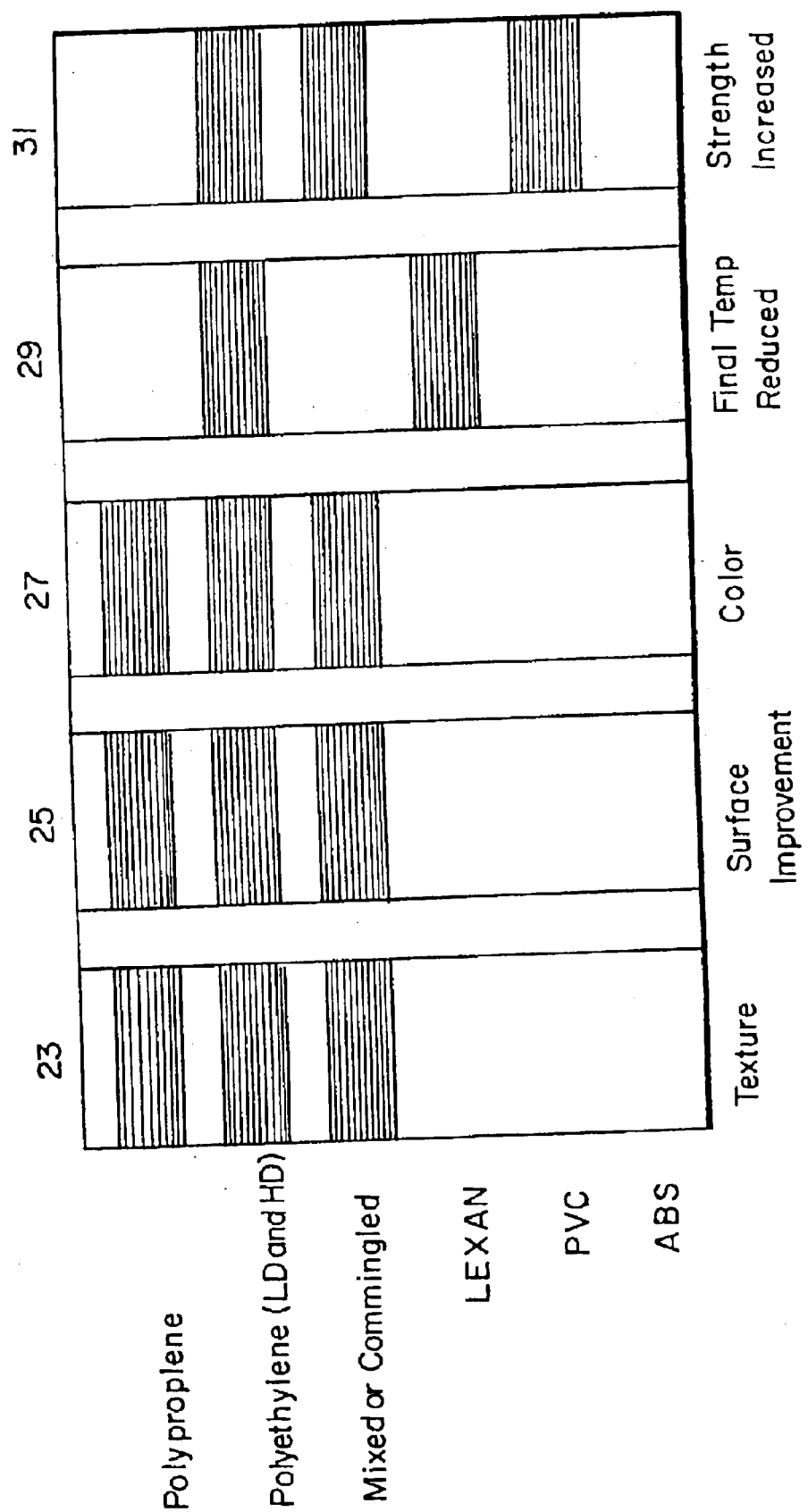
FIG. 9 is a chart showing the advantages to articles made from various NOAG-thermoplastic resin compositions.

As shown in FIG. 9, the final articles made from the NOAG-polypropylene composition were observed to have an improvement in texture 23, and surface smoothness 25, and the color distribution 27 of the articles appeared more even.

Figure 2:
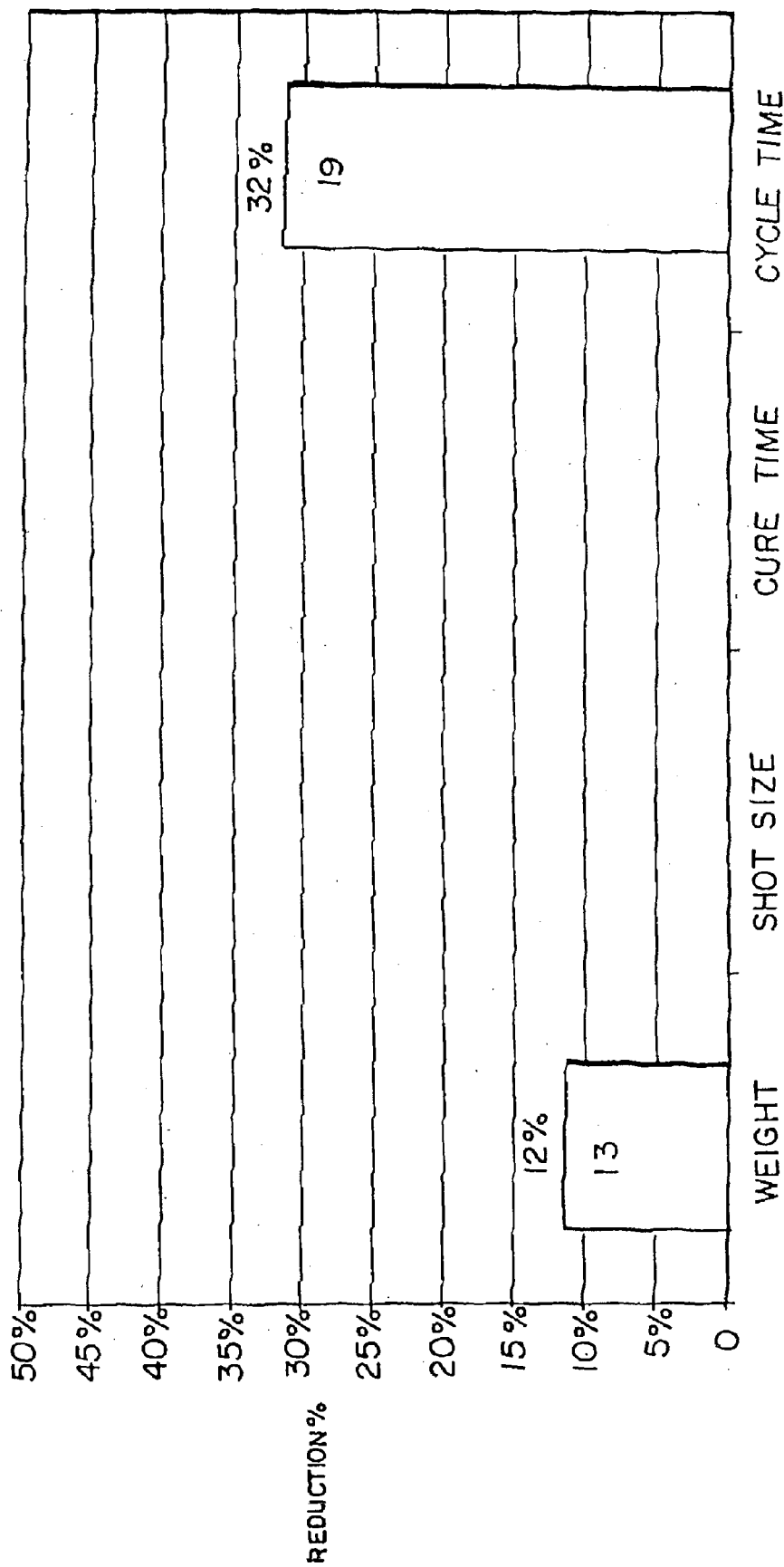
FIG. 2 is a chart showing the processing advantages to using NOAG with polyethylene.

FIG. 2 is a chart illustrating the results of a test using a NOAG-polyethylene resin composition according to the present invention. The composition was NOAG at a quantity of 1% by weight of the composition added to polyethylene. The inventors observed that the final articles were reduced in weight 13 by about 12% and the overall cycle time per article 19 made from the NOAG-polyethylene resin was reduced by about 32%. As shown in FIG. 9, the articles appeared to have improved surface texture 23, less surface imperfections 25, and better color dispersion 27. In addition, the articles appeared to have a lower final temperature out of the mold 29, and increased strength 31.

Figure 3:
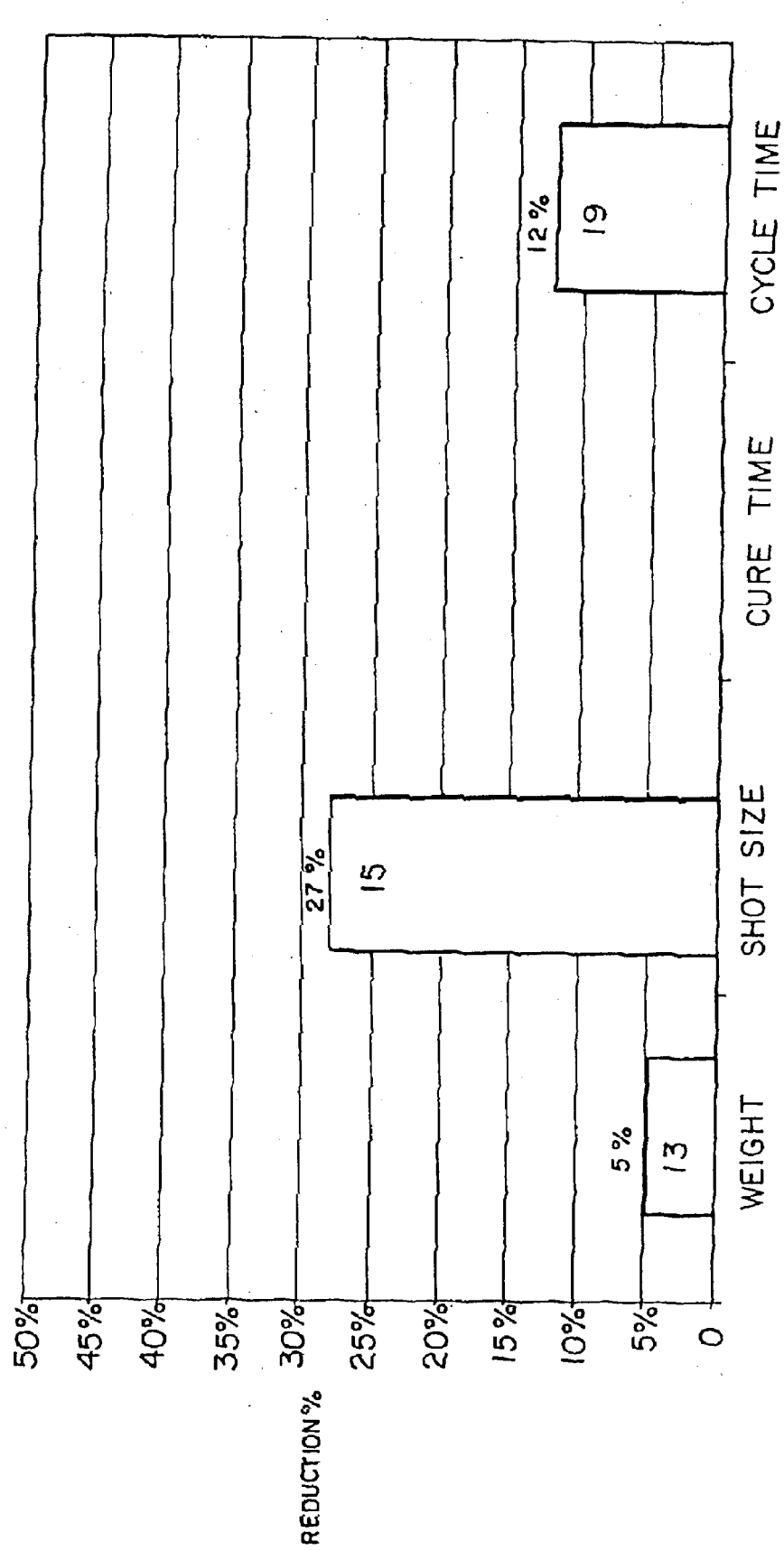
FIG. 3 is a chart showing the processing advantages to using NOAG with polyethylene.

FIG. 3 is a chart that illustrates the results of another test run using a NOAG-polyethylene resin composition at a higher NOAG loading. The composition was polyethylene with a quantity of NOAG at 1.5% by weight of the composition. The inventors observed that the final weight 13 of the articles were reduced by about 5%, the volume of resin needed to make the articles, the shot size 15, was reduced 27%, and the overall cycle time 19 for the articles was reduced by 12%.

As shown in FIG. 9, the articles made from this NOAG-polyethylene composition with more NOAG appeared to have improved texture 23, improved surface 25, and better color 27 distribution than the articles made from virgin resins. The final temperature of the articles 29 appeared to be reduced and the articles appeared to have increased strength 31.

Figure 4:
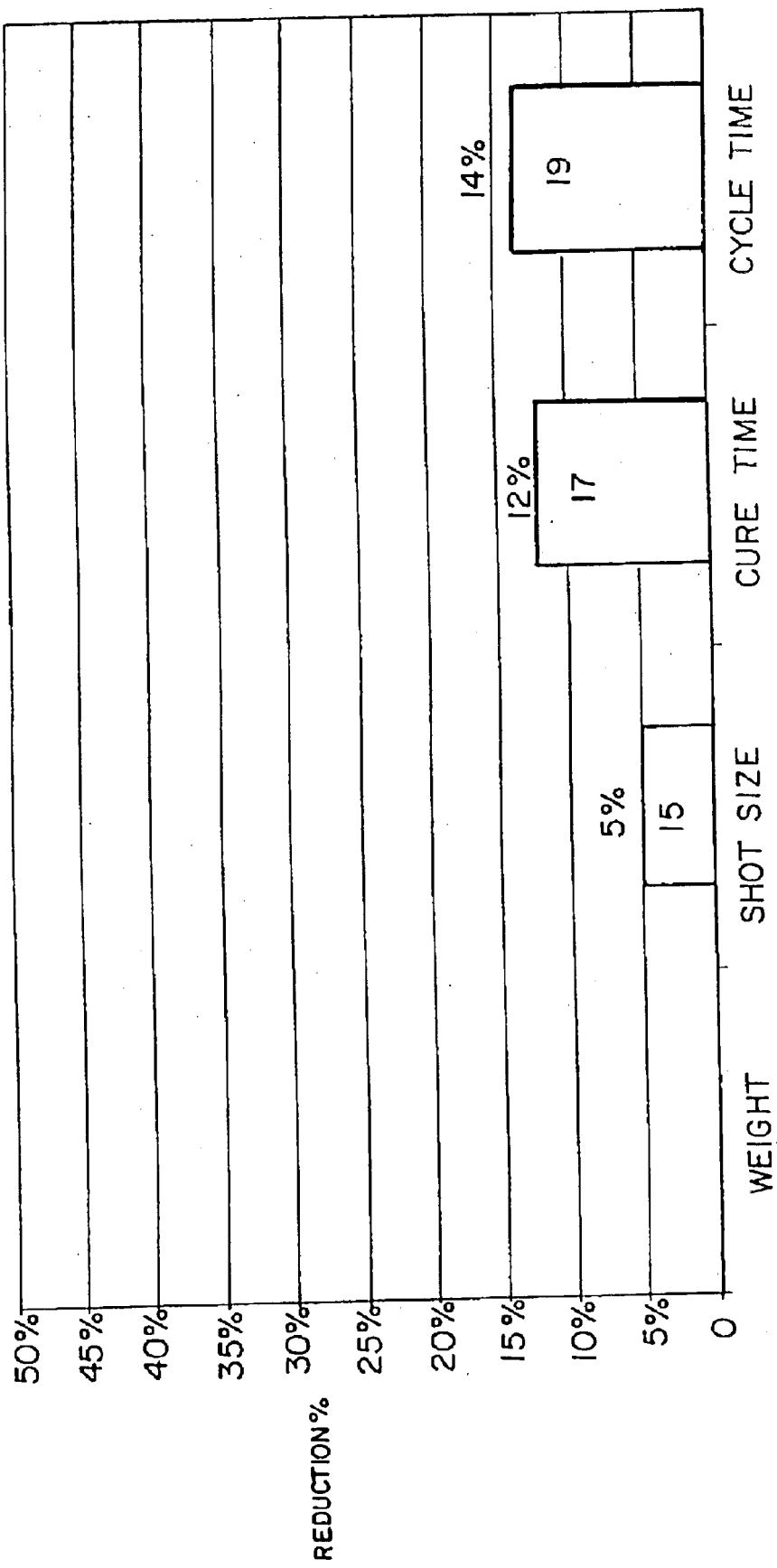
FIG. 4 is a chart showing the processing advantages to using NOAG with polyethylene.

FIG. 4 is a chart that shows the results of another test run using a NOAG-polyethylene resin composition at a still higher NOAG loading. The composition was NOAG at a quantity of 2% by weight of the composition added to a polyethylene resin. The inventors observed that the amount of resin needed to make the articles, the shot size 15, was reduced by about 5%, the cure time 17 for each article was reduced by about 12%, and the cycle time 19 for each article was reduced by 14%.

In addition, the articles (FIG. 9) appeared to have improved texture 23, improved surface quality 25, and improved color distribution 27. The final temperature 29 of each article appeared to be reduced, and the strength 31 of each article seemed to have increased.

Figure 5:
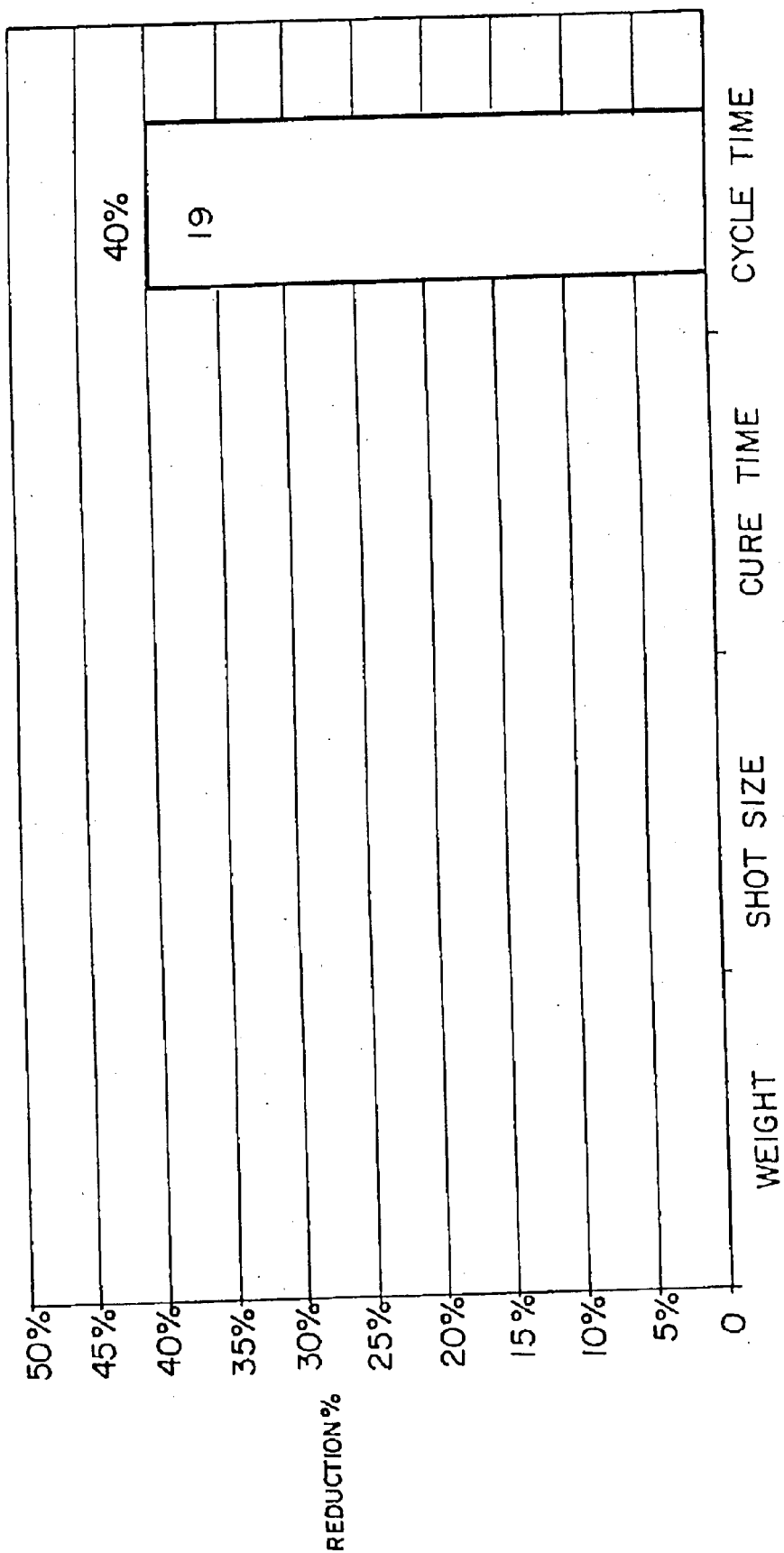
FIG. 5 is a chart showing the processing advantages of using NOAG with a mixture of thermoplastics including recycled resins.

FIG. 5 is a chart that illustrates the results of a test using a mixture of different resins or commingled plastic resins with a quantity of NOAG at 1.5% or 2% by weight of the composition. The mixture of resins used for the test included a mixture of high-density polyethylene in virgin and recycled form, a mixture of high-density polyethylene and polypropylene, and a mixture of high-density polyethylene and ABS. FIG. 5 shows that, uniformly for each of the NOAG-commingled resin composition with the NOAG quantity at 1.5% or 2% by weight of the composition, the cycle time 19 for the manufacture of the articles decreased by about 40%.

As shown in FIG. 9, the articles produced from the NOAG-mixed resin compositions appeared to have improved texture 23, greater surface smoothness 25, better color distribution 27, and increased strength 31.

Figure 6:
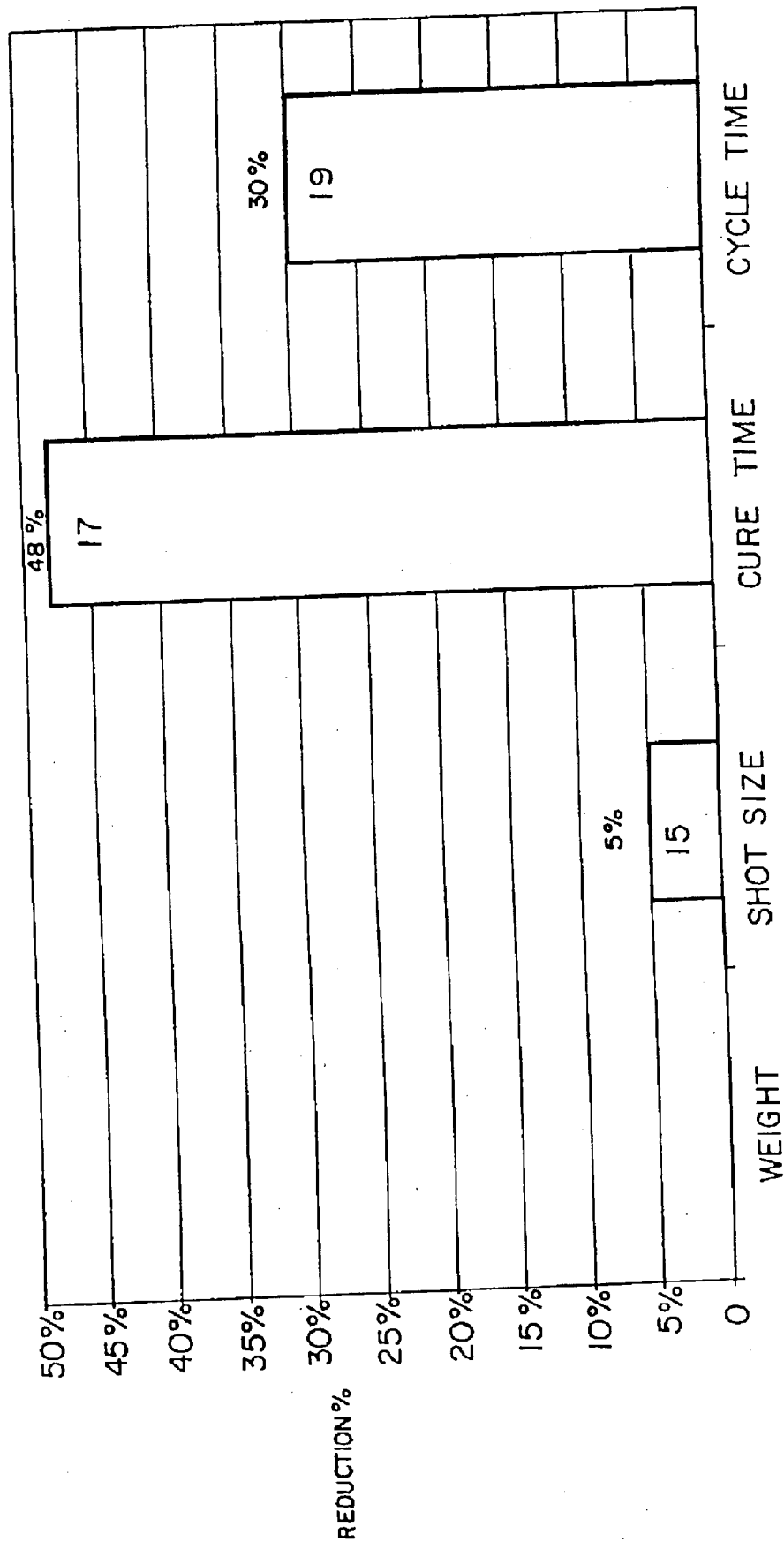
FIG. 6 is a chart showing the processing advantages of using NOAG with the thermoplastic LEXAN.

FIG. 6 is a chart that illustrates the results of a test using LEXAN, an engineered thermoplastic proprietary to G.E. Plastics. The test used a NOAG-LEXAN composition with NOAG at 1.5% and 2% by weight of the composition. The composition was used to produce telephone housings and electronic parts. The test results indicated that shot size 15 for each part was reduced by 5%, cure time 17 for each part was reduced by 48%, and cycle time 19 for each article was reduced by 30%.

As shown in FIG. 9, the articles appeared to have a final temperature reduction 29 as it came out of the mold.

Figure 7:
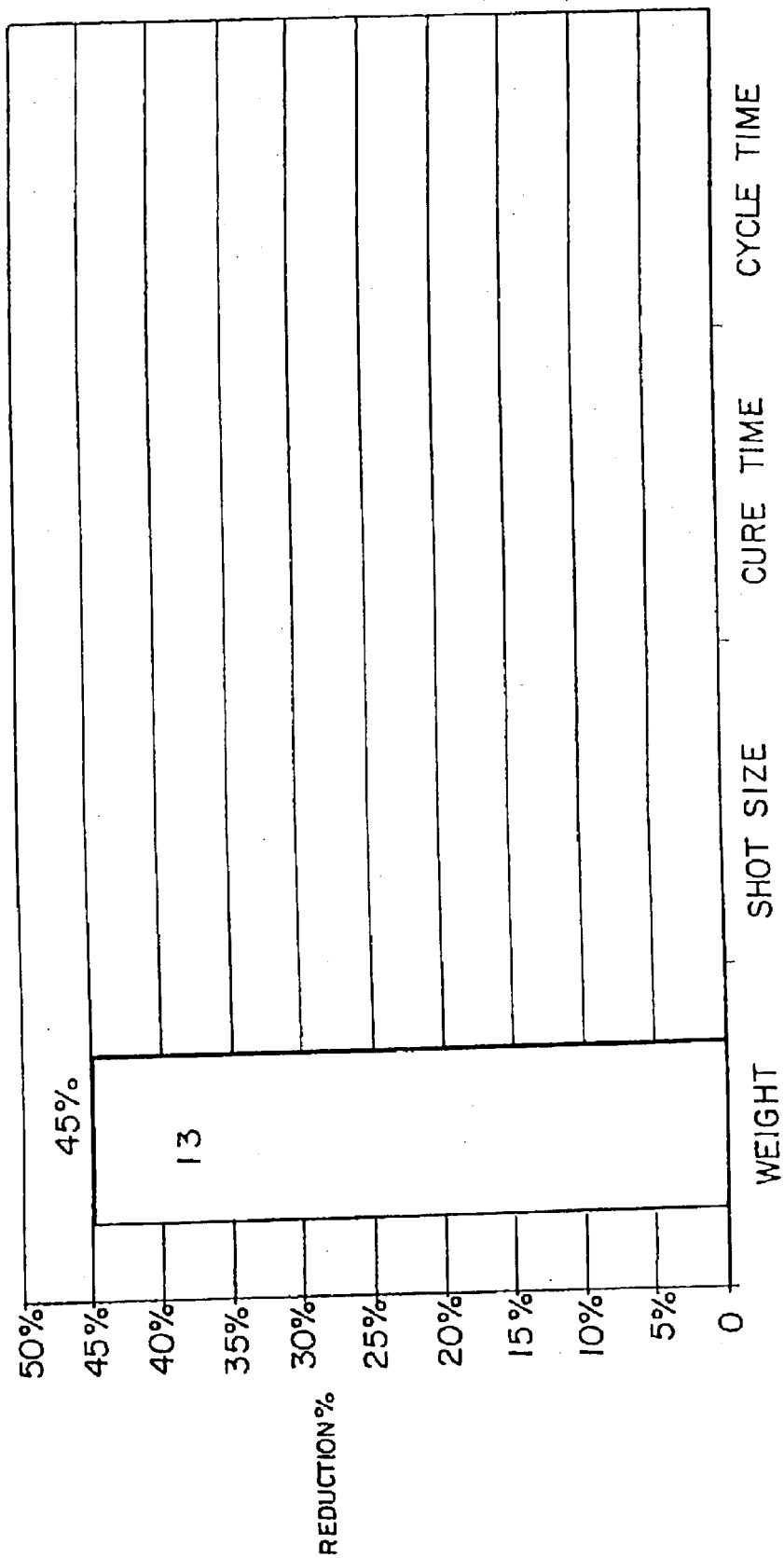
FIG. 7 is a chart showing the processing advantages of using NOAG with PVC.

FIG. 7 is a chart that illustrates the results of tests conducted by the inventors using polyvinyl chloride (PVC) in an extrusion molding process. The test used a NOAG-PVC composition with NOAG at 1% by weight of the composition. The test results show that the overall weight 13 of each product was reduced by 45%. At the same time, as shown in FIG. 9, the strength 31 of the article appeared to have increased.

Figure 8:
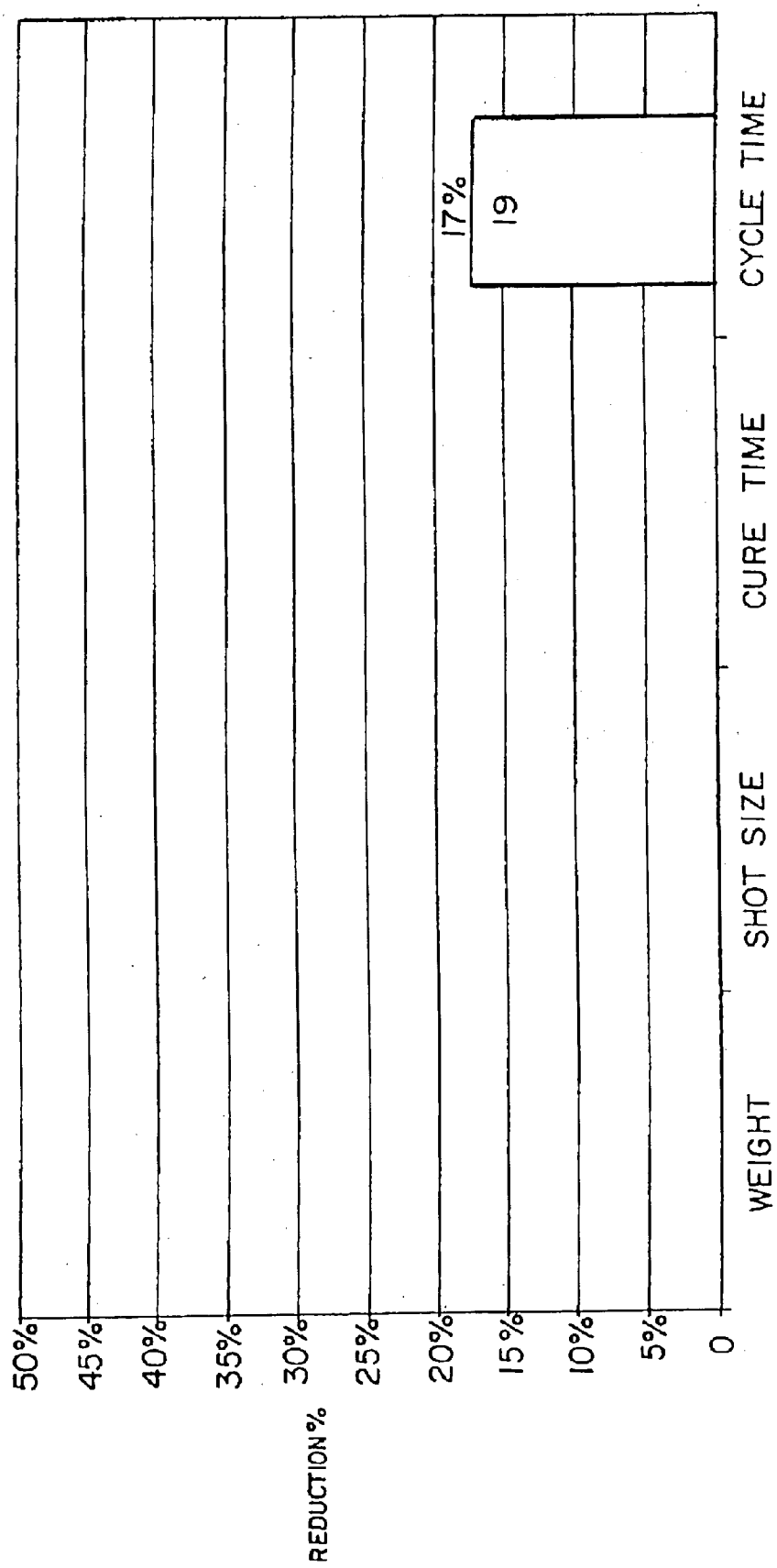
FIG. 8 is a chart showing the processing advantages of using NOAG with ABS.

FIG. 8 is a chart that illustrates the results of a test conducted using ABS resin and NOAG at 1.5% by weight of the composition to make sprinkler heads in an injection molding machine. The test results show that the cycle time 19 for each article was reduced by about 17%.

The inventors have continued to test and evaluate NOAG-thermoplastic resin compositions since they observed the unexpected and surprising results shown in FIGS. 1–9. Experimentation was devised in order to ascertain whether there was an optimized range for the NOAG. More scientific procedures were adopted to prove or disprove the results observed by the earlier test results shown in FIGS. 1–9.

Naturally occurring aluminosilicate glass (NOAG) is an amorphous material. Since amorphous materials do not have a regular crystalline structure or molecular structure, it is not possible to define its composition by means of a chemical formula. The only way to define the composition of an amorphous material is by chemical analysis. As is customary in the geological sciences, the chemical composition of naturally occurring aluminosilicate glass may be expressed in terms of weight percent of the element oxides.

Preferred Chemical Composition of NOAG

As it turns out, naturally occurring aluminosilicate glasses have a large chemical range and form. This is most probably due to the number of different geologic processes that create them. However, the overwhelming majority of natural aluminosilicate glasses form as a result of igneous processes. The composition of natural aluminosilicate glasses can encompass nearly the entire range of igneous rocks. However, natural glasses are most common and abundant in felsic igneous rocks (e.g., rhyolite or its crystalline equivalent, granite). Even within felsic igneous rocks, there is considerable chemical variation among rocks from different locations. We have discovered that the NOAG that works best in the creation of our NOAG-thermoplastic resin compositions has the following weight percent of element oxides within the listed chemical range.

| | |
|---|---|
| $SiO_2$ | 66–77% |
| $TiO_2$ | 0–2% |
| $Al_2O_3$ | 10–22% |
| $Fe_2O_3$ | 0–4% |
| MgO | 0–2% |
| CaO | 0–3% |
| $Na_2O$ | 2–8% |
| $K_2O$ | 2–8% |
| All other element oxides | 0–1% |
| $H_2O$ | 0–20% |

Aluminosilicate glasses occur naturally when molten silicate rock (magma) is chilled so rapidly that there is insufficient time for the relatively unstructured melt to form crystalline minerals with a regular internal structure. The chaotic structure of the molten silicate is frozen due to the rapid cooling. Typically, rapid cooling occurs when magma is erupted onto the earth's surface. The eruption mechanism can range from quiescent to highly explosive. The form of the eruptive process may be a quiet lava flow to highly explosive eruptions that give rise to deadly "glowing avalanches" of essentially molten, but disaggregated magma. Thus, the texture of the aluminosilicate glass may vary from a solid mass, in the case of lava flow, to fine particles of ash resulting from highly explosive eruptions.

All physical forms of the aluminosilicate glass may be used as starting material. In a preferred method of preparation, the glass rock is milled to particle sizes on the order of 100 microns or less. The crushing and milling process destroys all textural features of the original rock (i.e., solid rock or ash particles). Therefore, its original textural features are irrelevant to the performance of the NOAG in composition. As a result, all naturally occurring aluminosilicate glass within the composition range specified above, regardless of its original texture or geologic mechanism of formation, may be used as a starter material.

Most naturally occurring aluminosilicate glasses contain crystalline minerals as well. Magma as it usually occurs is more than simply molten silicate rock. Besides molten silicate rock, it may contain bits and pieces of crystalline minerals that were scavenged from the walls of the conduit through which the magma passed, crystalline minerals formed due to cooling of the magma as it passes through the earth's crust (e.g., quartz, feldspar, and biotite), as well as crystalline minerals that can form during eruption, transport, deposition, and cooling of the molten silicate rock (e.g., cristobalite, feldspar, quartz, and biotite). Furthermore, aluminosilicate glass is inherently unstable and can form crystalline minerals (e.g., cristobalite, feldspar, quartz, smectite-groups clays, kaolinite-group clays) over geologic time with or without the catalytic activity of heat, water or dissolved chemicals.

Figure 10:
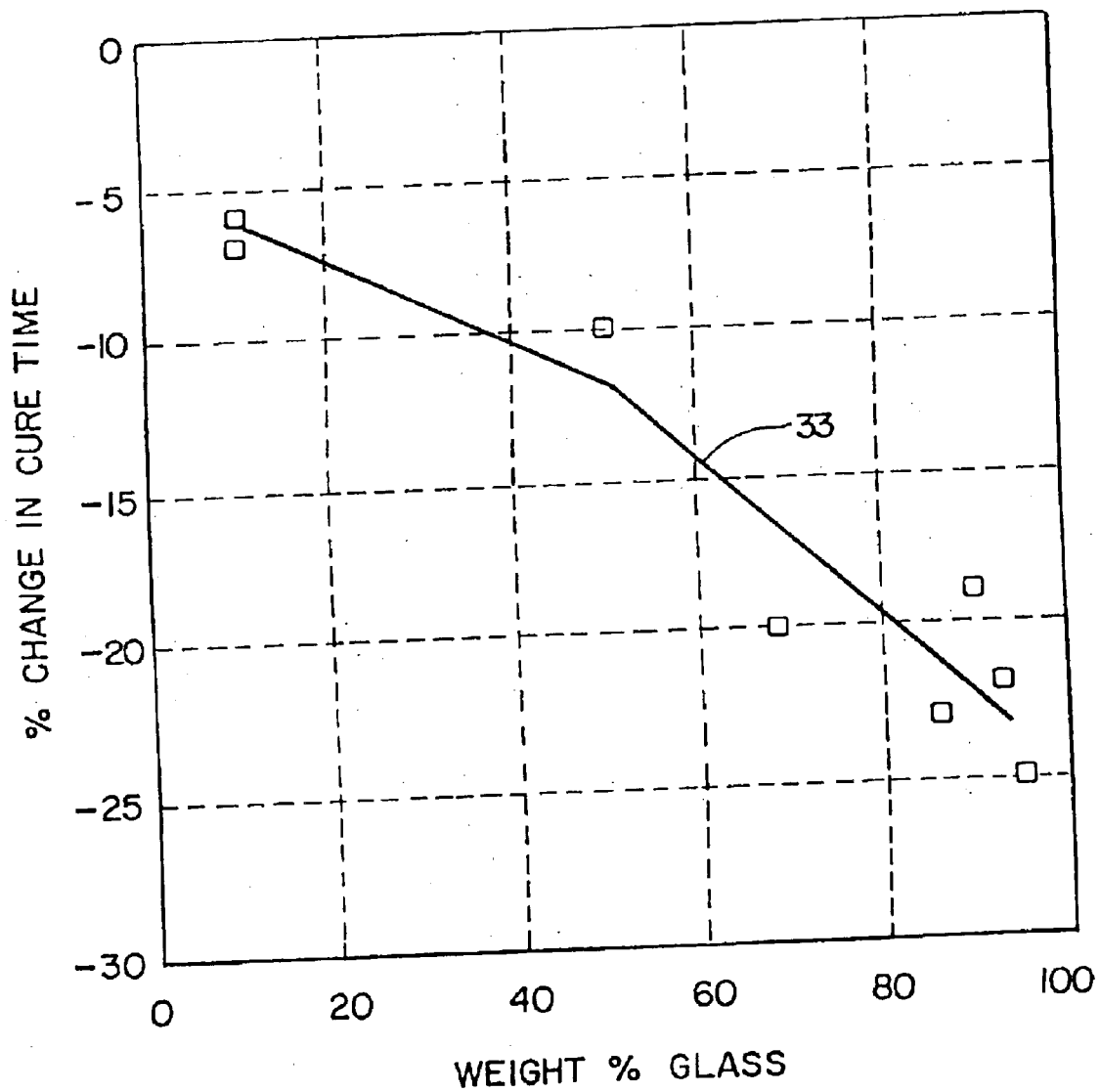
FIG. 10 is a graph showing the effect of glass content in the NOAG on cure time of a NOAG-thermoplastic resin composition.

All the crystalline minerals contained in the naturally occurring aluminosilicate glass are considered impurities with respect to the present invention. Through experimentation, the inventors have discovered that the crystalline minerals are not effective components in the thermoplastic molding environment. A series of NOAG-resin compositions were formulated in which the primary variable was the abundance of glass in the NOAG. The effect of these NOAG compositions was assessed in an injection molding press by determining the change in cure time as a function of glass content. FIG. 10 is a graph that shows the results of that test. As curve 33 shows, reduction in cure time is directly proportional to the glass content of NOAG. These results show us that the crystalline minerals actually degrade the performance of the synthetic NOAG-thermoplastic resin composition of the present invention.

Preferred NOAG Concentration in the Composition

The concentration of NOAG in the NOAG-thermoplastic resin composition is defined by the weight percent of NOAG in the NOAG-resin composition. The NOAG may be introduced into the resin by dry blending a concentrate pellet of NOAG and a universal carrier such as LLDPE, or by direct compounding into the selected resin.

Figure 11:
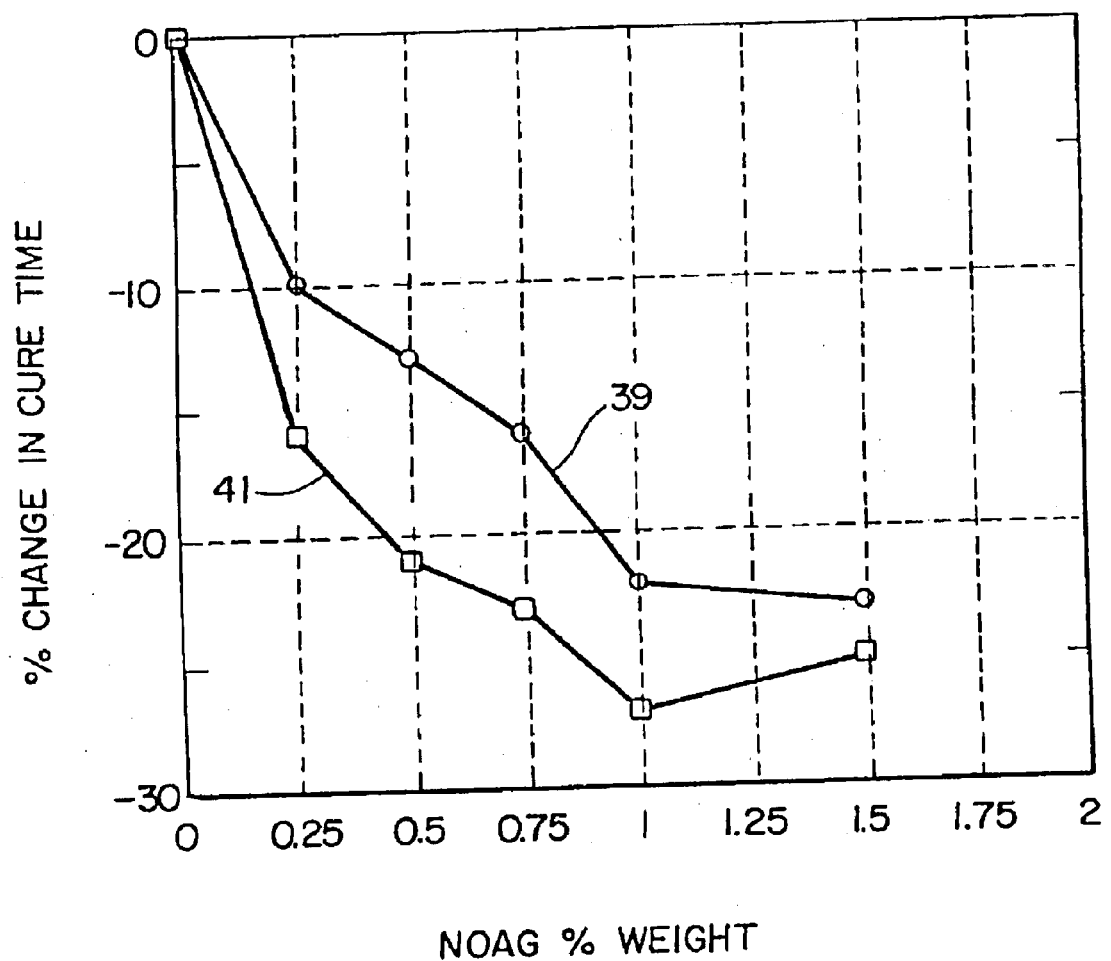
FIG. 11 is a graph showing the effect of NOAG loading on cure time with the NOAG particle size at less than 325 mesh.

Unexpected and surprising results occur with unusually low concentrations of NOAG. Although a minimum concentration of NOAG has not been defined, addition of as little as 0.25% by weight, leads to the unexpected reduced cure time of 10–16%. As shown in FIG. 11, graph 39 shows NOAG having less than 325 mesh particle size in a carrier reducing cure time by 10% when only 0.25% by weight of the composition is used. Graph 41 of FIG. 11 shows directly compounded NOAG having less than 325 mesh size reducing cure time by 16% when only 0.25% by weight of the composition is used. As shown by both graphs 39 and 41, increased concentrations from 0.5% to 1.0% of less than 325 mesh NOAG provides even greater decreases in cure times to a maximum of 28%. The upper limit of NOAG concentration has not been definitively determined. It is presently preferred that the NOAG concentration be below 3.0% by weight of the NOAG-thermoplastic resin composition.

Application of the NOAG-Thermoplastic Resin Composition

The NOAG-thermoplastic resin composition discovered by the inventors would be of little interest if there was limited or no application for it. To the contrary, the NOAG-thermoplastic resin composition has an exceptionally wide application, both in terms of resin types and in terms of molding processes.

Of paramount importance is the fact that the NOAG-thermoplastic resin compositions of the present invention are not restricted to one or a few resin types. This has been established by field testing of the NOAG-resin compositions in injection-molding presses making a variety of items and using a variety of thermoplastic resins. Table 1 below demonstrates that the NOAG-thermoplastic resin compositions using a variety of resins are substantially better than virgin resins when judged by cycle time reduction. Reduced cycle time translates to increased throughput on the number of articles that can be produced in a time frame.

TABLE 1

| Process | Mach Mfr/Size | Product/ Cavities | Material/ Cost | Sec.- Original Cycle | Sec/Cycle (−) or fpm (+) Line Speed | Increased Throughput |
|---|---|---|---|---|---|---|
| InjM | Toyo/200 | Handle | ABS | 34.6 | 8.4 | 32.00% |
| InjM | Penwalt Stokes | Figure | ABS | 65 | 28 | 76.00% |
| InjM | Cinc-Mil/300 | Sprinkler/4 | ABS-Eng | 43.5 | 7 | 19.18% |
| InjM | Cinc-Mil/300 | Cone | ABS-Eng | 34 | 4 | 11.76% |
| InjM | JSW/700 | Support | ABS-Eng | 279.6 | 239.6 | 27.32% |
| InjM | Cinc | Hinge Cover/4 | Dynaflex | 25.5 | 8.2 | 47.40% |
| InjM | Engel/750 | Tub | HDPE | 62.22 | 7.78 | 14.29% |
| InjM | Cinc-Mil/700 | Milk Crate | HDPE | 35.5 | 12 | 51.08% |
| InjM | Cinc-Mil/700 | Crate | HDPE | 18.5 | 6.5 | 54.17% |
| InjM | Mire | Chair | HDPE | 48.5 | 9.5 | 24.36% |
| InjM | VanDorn/750 | Soda Crate/2 | HDPE/LPDE w/slip agent | 25.5 | 10.2 | 66.67% |
| InjM | Toyo/200 | Water Faucet/12 | LDPE | 17.9 | 4.7 | 35.61% |
| InjM | VanDorn/170 | Tel housing | Lexan w/additive | 27 | 7.2 | 36.36% |
| InjM | VanDorn/150 | PN-15XXX/2 | Lexan H136 w/additive | 26.65 | 10 | 60.06% |
| InjM | Arburg | Fitting | Nylon 6/6 | 11.1 | 2.2 | 25.00% |
| InjM | Sandretto | Housing/16 | Nylon 6 | 17.1 | 3.5 | 25.74% |
| InjM | Cinc-Mil/150 | Sprocket/2 | Nylon 6/6 | 39.7 | 12.1 | 55.08% |
| InjM | Penwalt Stokes | Figure | PP | 50 | 17 | 52.00% |
| InjM | Mitsubishi/720 | Tile | PP | 59.85 | 7.67 | 14.70% |
| InjM | VanDorn/770 | Office Part | PP | 35.5 | 9.7 | 37.60% |
| InjM | Magna/600 | Office Part | PP | 28.8 | 5.7 | 24.68% |
| InjM | Olma/550 | Battery Case/2 | PP | 51.6 | 12.14 | 30.77% |
| InjM | Cinc-Mil/750 | Shutter | PP | 73 | 28.7 | 64.79% |
| InjM | Cinc-Mil/440 | Warm Light/2 | PP | 56.5 | 13 | 29.89% |
| InjM | Nissel/399 | Brush handle/10 | PP | 39.9 | 11.6 | 40.99% |
| InjM | Nissel/399 | Brush/4 | PP | 38.4 | 16.8 | 77.78% |
| InjM | Magna/310 | Flower Pot | PP | 27.5 | 9.3 | 61.10% |
| InjM | Cinc-Mil/310 | Container/8 | PP | 25.48 | 4.48 | 21.33% |
| InjM | JSW/700 | Tray | PP | 57.5 | 11 | 23.70% |
| InjM | Cinc-Mil/1000; Maxed | Tote | PPcoP | 32.17 | 5.96 | 22.74% |
| InjM | Cinc-Mil/1000 | Chair backs | PPcoP | 139 | 25 | 21.93% |
| InjM | Cinc-Mil/700 | Chair seats | PPcoP | 55.4 | 21 | 61.05% |
| InjM | VanDorn/1000 | Door Panel | PPcoP | 52.9 | 11.7 | 28.40% |
| InjM | Husky/550 | Door Panel | PPcoP | 91.7 | 19.2 | 26.48% |
| InjM | DeMag/440 | Door Panel | PPcoP | 42.7 | 4.6 | 12.07% |
| InjM | DeMag/440 | End Caps/2 | PPcoP | 42.7 | 8.1 | 23.41% |
| InjM | Cinc-Mil/700 | Steering Wheel | PPcoP | 110.53 | 41.11 | 59.22% |
| InjM | HPM/1500 | Storage Container | PPcoP | 34.8 | 8.2 | 30.83% |
| InjM | Husky/550 | Door Panel | PPcoP | 71.5 | 16.9 | 33.40% |
| InjM | Cinc-Mil/300 | Speaker Trim/2 | PPcoP | 60 | 20 | 50.00% |
| InjM | Cinc-Mil/525 | Head | PPcoP | 63.4 | 10.6 | 20.08% |

TABLE 1-continued

| Process | Mach Mfr/Size | Product/ Cavities | Material/ Cost | Sec.-Original Cycle | Sec/Cycle (−) or fpm (+) Line Speed | Increased Throughput |
|---|---|---|---|---|---|---|
| InjM | HPM/225 | Dam | PPcoP | 51.6 | 10.4 | 25.24% |
| InjM | VanDorn/500 | Brush Handle/16 | PPcoP | 45 | 9 | 25.00% |
| InjM | Cinc-Mil/1000 | Valve | PPcoP | 50.22 | 16.2 | 47.62% |
| InjM | Cinc-Mil/500 | Wheel Tire/4 | PVC | 40.6 | 16.1 | 65.71% |

The largest contributor to cycle time reduction is cure time. Cure time is largely controlled by resin temperature when it enters the mold. Detailed and controlled testing of PP, TPO, and proprietary nanocomposite resins on the same press and mold, demonstrated that the NOAG-thermoplastic resin composition reduced cure time across resin types. As shown in Table 2 below, as compared to virgin resins, compositions of NOAG and TPO, nanocomposite, and PP have considerably reduced cure time and cycle time.

TABLE 2

| Sample | Wt. % NOAG | Injection Speed inches/seconds | Cure Time in seconds | Cycle Time in seconds |
|---|---|---|---|---|
| TPO | | | | |
| Virgin TPO | 0.00 | 6.0 | 20.0 | 49.0 |
| TPO + NOAG | 1.00 | 6.0 | 18.5 (−8%) | 34.5 (−26%) |
| NANOCOMPOSITE | | | | |
| Virgin Nano | 0.00 | 6.0 | 30.0 | 68.6 |
| Nano + NOAG | 1.00 | 6.0 | 13.0 (−57%) | 43.2 (−37%) |
| POLYPROPYLENE | | | | |
| Virgin PP | 0.00 | 6.75 | 34.5 | 47.8 |
| PP + NOAG | 0.25 | 6.75 | 31 (−10%) | 44.4 (−7%) |
| PP + NOAG | 0.50 | 6.75 | 30.0 (−13%) | 43.6 (−9%) |
| PP + NOAG | 0.75 | 6.75 | 29.0 (−16%) | 42.8 (−11%) |
| PP + NOAG | 1.00 | 6.75 | 27.0 (−22%) | 40.6 (−15%) |
| PP + NOAG | 1.50 | 6.75 | 26.5 (−23%) | 40.2 (−16%) |

Besides testing the NOAG-thermoplastic resin compositions in injection molding systems, other thermoforming environments also were used. The results in these environments are equally unexpected and surprising. In extrusion molding, for example, it was clearly unexpected that a resin containing a solid (NOAG) can be extruded at rates of 34–211% greater than that of the resin alone. Furthermore, extruded articles such as tubing and wire sheaths exhibited a more uniform thickness and better surface finish. In blow molding systems, it was surprising that article throughput increased 17–35% with the addition of a solid (NOAG) to a resin. As illustrated in Table 3 below, significant, unexpected, and surprising results were obtained in increased throughput as measured in feet per minute (fpm) when using NOAG in combination with six different thermoplastic resins.

TABLE 3

| Molding Process | Molding Equipment | Resin System | Standard Line Speed/Cycle Time | Line Speed/Cycle Time With NOAG | Increased Throughput |
|---|---|---|---|---|---|
| Extrusion | NRM 111 | MDPE | 11.0 fmp | 16.0 fpm* | 45.50% |
| Extrusion | NRM 111 | PP | 22.0 fpm | 29.5 fpm* | 34.1% |
| Extrusion | N/A | PVC | 123 fpm | 260 fpm | 211.4% |
| Blow Molding | BEKUM H-121 | HDPE | 14.5 sec. | 10.72 sec. | 35.3% |
| Blow Molding | Hayssen | HMPE | 67 sec. | 57 sec. | 17.5% |
| Blow Molding | Jackson | LDPE | 30.5 sec. | 25.5 sec. | 19.6% |

*blowing agent reduced by 50%

As a general rule, the typical molding temperature of a given virgin resin can be lowered when molding with a NOAG-resin composition and still maintain the ability to mold a high-quality part. In one experiment with PP, the nozzle temperature was lowered from 410° F. to 390° F. and the barrel temperature was lowered from 400° F. to 370° F. with no decrease in part quality. Temperature decreases of 20–40° F. are typical for many resins in a wide variety of molding environments. A lower barrel and nozzle temperature is important for two reasons: (1) the lower resin temperature in the barrel means that the resin is cooler when it reaches the mold; therefore, the cure time can be reduced significantly, and (2) the lower resin temperature reduces the amount of thermal degradation of the resin, particularly when operating temperatures are near or at the maximum operating temperature for the resin. Reducing thermal degradation is critical to assuring the physical, mechanical and thermal properties of the resin as well as assuring longevity of the molded article.

Figure 12:
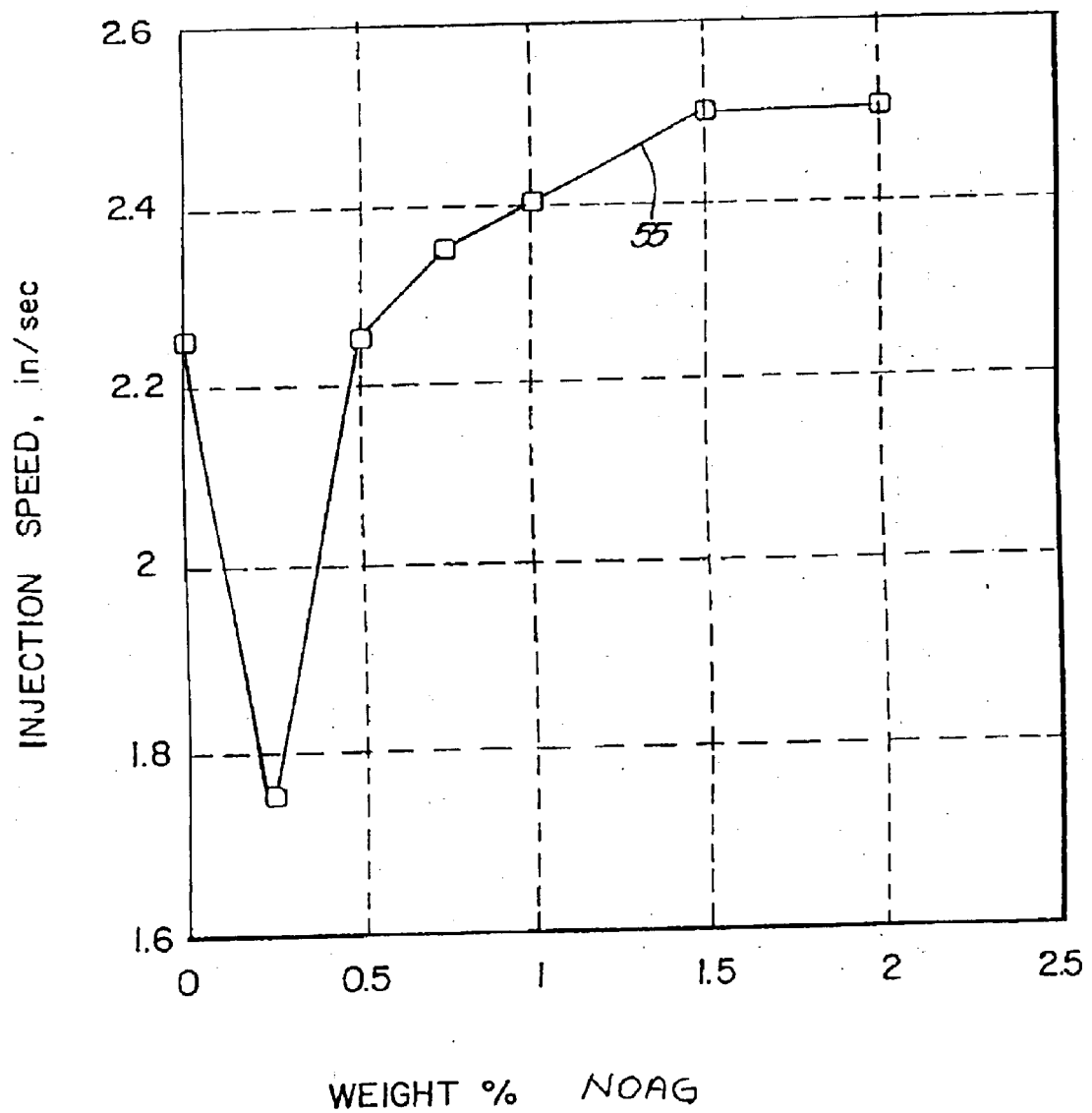
FIG. 12 is a graph showing the effect of NOAG loading on injection speed with NOAG particle size less than 325 mesh.
Figure 13:
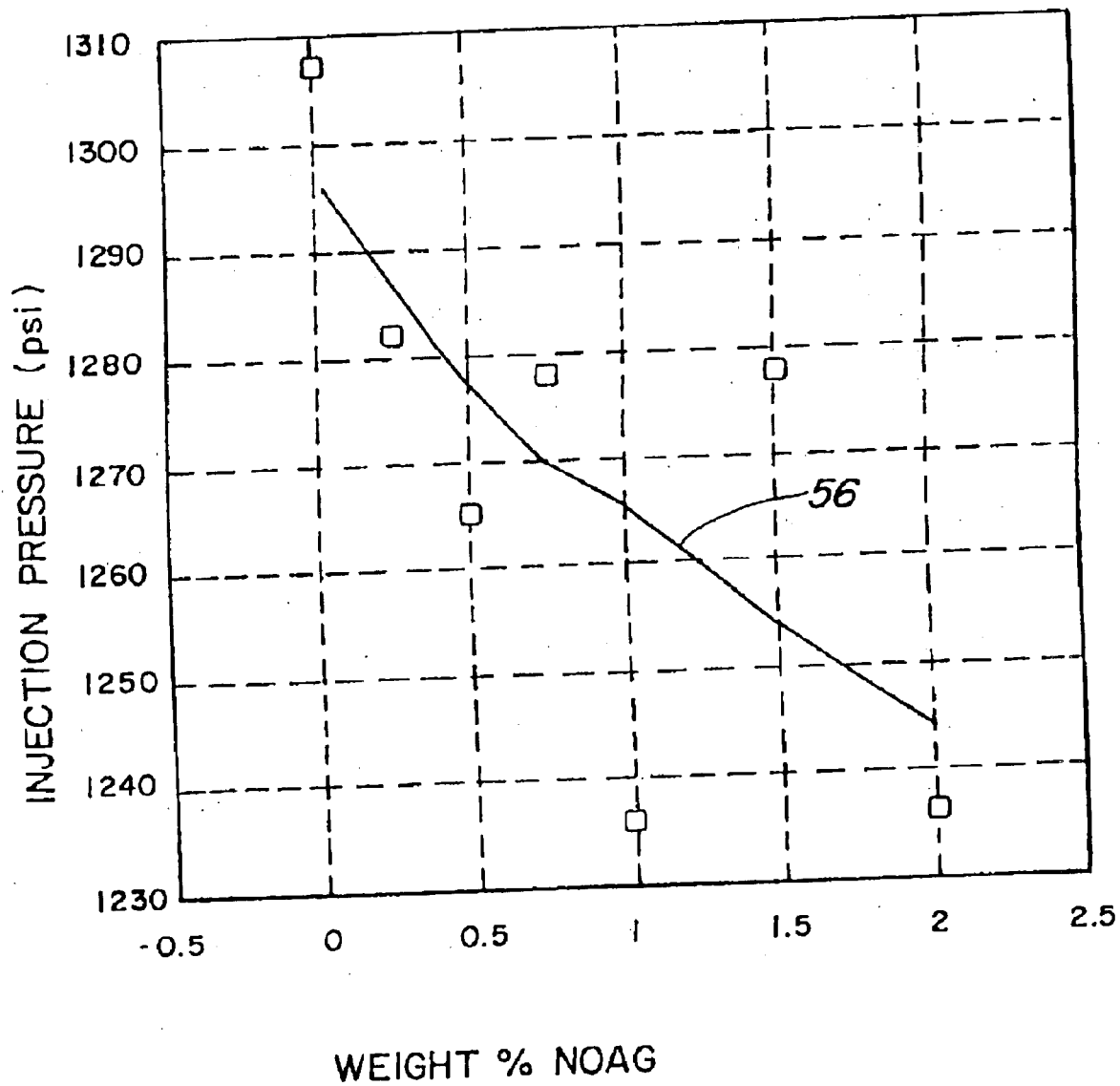
FIG. 13 is a graph showing the effect of NOAG loading on injection pressure with NOAG particle size at less than 325 mesh.

A NOAG-resin composition also reduces the wear on molding machines. In one experiment on an injection press, the injection speed was set at 2.25 in/sec. Various NOAG-resin compositions were sequentially introduced to the press to determine how the injection speed would change as a function of NOAG loading. In FIG. 12, curve 55 teaches us that at NOAG concentrations of 0.5% or greater, the injection speed increases with NOAG loading. Since the power settings for the injection speed were not changed, the increase in injection speed means that the NOAG-resin composition provided less resistance to injection. Another measurement, the pressure in the barrel during injection, also reflected the greater ease in injecting the NOAG-resin composition. As shown by curve 56 on FIG. 13, the pressure in the barrel decreased with an increase of NOAG in the NOAG-resin composition. Both of these parameters indicate that a press would require less force and with less force, there would be less wear on the press. Other molding machines most likely have less wear and tear upon introduction of a NOAG-resin composition as well. For example, an extruder screw often increases in speed when a NOAG-resin composition replaces virgin resin.

The conclusion that the NOAG-resin composition requires less force to mold articles is supported by measurements of electrical consumption. In one experiment, PP was injected molded. The press was optimized for virgin PP and the electrical consumption per part was determined to be 0.405 Kwatts/article. Molding the part with the NOAG-resin composition required only 0.391 Kwatts/article or about 3.5% less energy. What is even more surprising and unexpected is the fact that barrel and nozzle temperatures could be reduced 20–30° F. and this energy savings as compared to virgin resin was not included in calculation of the 3.5% energy reduction.

NOAG-resin compositions effectively clean the barrel and screw regions of molders. On numerous occasions, we have noted molded or extruded plastic articles of NOAG-resin that are heavily contaminated with bits and pieces of charred resin, colored resin unlike any recently used in the molder and other contaminants such as hairs, paper fiber or unknown materials. In long testing cycles, bits of charred or colored resin occasionally appear some 6 hours after introduction the NOAG-resin composition. In one particularly noteworthy experiment, a series of 6 NOAG-resin samples were progressively compounded in an extruder and then injected molded into test plaques. The objective was to determine whether NOAG-resin compositions with variable NOAG loadings could be as optically clear as virgin resin. The expected result was that the optical clarity would decrease with NOAG loading. In fact, there was no correlation with loading, rather the correlation was with the sequence of extrusion and injection molding—the first samples had the least optical clarity and the last had the best. In fact, the test was such a failure, the molder extruded new compounded NOAG-acrylic pellets and molded new test plaques after cleaning the extruder and injection molder. Although the results were somewhat better, there were still visible bits of charred and colored resin in the clear acrylic, thus indicating that the NOAG-resin composition was better at removing contaminants stuck to the screw and barrel surfaces than even their best cleaning method.

Many resins are manufactured with chemical agents or pigments to improve the moldability of the resin. The NOAG-resin composition enhances the performance of the additives. For example, extruded foam articles require 50% less blowing agent to achieve the same quality part (Table 3). The impact resistance of NOAG-resin composition in which the resin has a chemical impact modifier is 40% higher than the resin without NOAG. On a more qualitative basis, pigmented plastic articles composed of NOAG and resin have a far more uniform distribution of color, and in some cases, a greater saturation of color than resin alone.

As already noted, a particular resin is chosen for the manufacture of an article because of the physical, mechanical and thermal properties it will provide the finished articles. As noted above, the addition of NOAG to thermoplastic resins creates a new composition that has significantly different responses to the heat and pressure typical in a thermoforming environment. These different responses, as already described, are great attributes of the new NOAG-thermoplastic resin composition. However, these attributes would be of little interest if the synthetic NOAG-thermoplastic resin composition produced articles that had physical, mechanical and thermal properties that are substantially different from articles produced by the virgin resin.

Extensive evaluation of the physical, mechanical and thermal properties for the NOAG-thermoplastic resin compositions have failed to identify any consistent substantial difference between articles made from virgin resin and articles made from the NOAG-resin composition. The inventors tested the NOAG-thermoplastic resin composition using six different resins. The NOAG was added at 1% or 1.5% by weight of the composition. The results shown in Table 4 below indicate that there are no systematic or substantial changes in any of the measured properties across the spectrum of tested resins.

TABLE 4

|  | Polypropylene | Polypropylene plus 1% NOAG | High Density Polyethylene (HDPE) | HDPE plus 1% NOAG |
| --- | --- | --- | --- | --- |
| PHYSICAL |  |  |  |  |
| Specific gravity (g/cm$^3$) | 0.893 | 0.897 | 0.934 | 0.941 |
| Shore hardness (D-scale) | 62 | 62 | 62 | 62 |
| MECHANICAL |  |  |  |  |
| Notched Izod impact, 73° F. | 0.5 | 0.5 | 0.5 | 0.6 |
| Tensile strength @ yield (PSI) | 4651 | 4745 | 3000 | 3066 |
| Tensile strength @ peak (PSI) | 4656 | 4751 | 3005 | 3070 |
| Tensile strength @ break (PSI) | 2622 | 2872 | 1381 | 1070 |
| Tensile elongation @ yield (%) | 10.1 | 10.1 | 10.5 | 10.3 |
| Tensile elongation @ break (%) | 131.5 | 157.9 | 88.2 | 88.0 |
| Tensile modulus (PSI) | 196200 | 212400 | 128200 | 129800 |
| Flexural strength @ yield (PSI) | 5672 | 5782 | 2682 | 2797 |
| Flexural strength @ peak (PSI) | 5688 | 5801 | 2751 | 2809 |
| Tangent Flexural Modulus (PSI) | 206300 | 201300 | 128800 | 136300 |
| THERMAL |  |  |  |  |
| Thermal analysis (DSC), ° C. (Peak melt temp.) | 171.4 | 169.1 | 134.5 | 133.0 |
| Heat deflection @ 264 PSI (° C.) | 60 | 59 | 52 | 50 |
| Brittleness temperature (−80° C.) | −80 (pass) no deformation | −80 (pass) no deformation | −80 (pass) no deformation | −80 (pass) no deformation |

TABLE 4-continued

|  | Lexan 121R | Lexan 121R plus 1.5 NOAG | Zytel 101L natural | Zytel plus 1.5% NOAG |
|---|---|---|---|---|
| PHYSICAL | | | | |
| Linear mold shrinkage | 0.0046 | 0.0045 | 0.162 | 0.129 |
| Water absorption | 0.083 | 0.077 | 1.00 | 0.90 |
| Specific gravity (g/cm$^3$) | 1.18 | 1.19 | 1.12 | 1.13 |
| MECHANICAL | | | | |
| Notched Izod impact, 73° F. | 12.8 | 11.1 | 1.2 | 0.96 |
| Notched Izod impact, −40° F. | — | — | 0.75 | 0.73 |
| Tensile strength @ yield (PSI) | 8429 | 8386 | 9570 | 9480 |
| Tensile strength @ Peak (PSI) | 8501 | 8462 | 9583 | 9576 |
| Tensile strength @ break (PSI) | 8032 | 7704 | 9574 | 9571 |
| Tensile elongation @ yield (%) | 7.8 | 7.5 | 6.8 | 6.6 |
| Tensile elongation @ break (%) | 80.9 | 74.2 | 32.6 | 22.9 |
| Tensile modulus (PSI) | 325700 | 322000 | 356100 | 356500 |
| Flexural strength @ yield (PSI) | 12901 | 12934 | 12896 | 12913 |
| Flexural strength @ peak (PSI) | 12921 | 12954 | 12912 | 12936 |
| Tangent Flexural Modulus (PSI) | 354900 | 344200 | 317000 | 350700 |
| THERMAL | | | | |
| Thermal analysis (DSC), ° C. (Glass/Peak melt temp.) | 147.2 | 146.3 | 265.1 | 267.4 |
| Heat deflection @ 66 PSI (° C.) | 135 | 135 | 211 | 211 |
| Heat deflection @ 264 PSI (° C.) | 123 | 123 | 79 | 79 |
| Brittleness temperature (−80° C.) | −80 (pass) no deformation | −80 (pass) no deformation | −80 (pass) no deformation | −80 (pass) no deformation |

|  | TPO | TPO plus 1.0% NOAG | Proprietary Nanocomposite | Nanocomposite plus 1.0% NOAG |
|---|---|---|---|---|
| MECHANICAL | | | | |
| Notched Izod impact, 73° F. | 8.2 | 5.8 | 7.6 | 7.6 |
| Notched Izod impact, −40° F. | 0.73 | 0.58 | 0.87 | 0.84 |
| Gardner falling dart impact | 181 | 178 | 178 | 170 |
| Tensile strength @ yield (PSI) | 2890 | 2830 | 2990 | 2930 |
| Tensile strength @ peak (PSI) | 2890 | 2830 | 2990 | 2930 |
| Tensile strength @ break (PSI) | 2250 | 2310 | 2210 | 2390 |
| Tensile elongation @ yield (%) | 13 | 13 | 17 | 16 |
| Tensile elongation @ break (%) | >500 | >500 | 120 | 370 |
| Tensile modulus (PSI) | 10700 | 10400 | 11300 | 11100 |
| Flexural strength @ yield (PSI) | 3390 | 3310 | 3100 | 3060 |
| Flexural strength @ peak (PSI) | 3680 | 3600 | 3320 | 3280 |
| Tangent Flexural Modulus (PSI) | 172000 | 166000 | 129000 | 133000 |
| THERMAL | | | | |
| Heat deflection @ 66 PSI (° C.) | 135 | 135 | 211 | 211 |

Differences between virgin resin and NOAG-thermoplastic resin composition articles were often well within uncertainty of measurement or could not be repeated in successive tests of the same material.

Of equal significance, the physical, mechanical and thermal properties of the NOAG-thermoplastic resin compositions are similar even with variation in the concentration of NOAG at less than 325 mesh particle size as shown by Table 5 below.

TABLE 5

|  | PP + Carrier | PP | 0.50%* | 1.00%* | 1.50%* | 2.00%* | 2.50%* | 3.00%* |
|---|---|---|---|---|---|---|---|---|
| Tensile (psi) | | | | | | | | |
| Tensile @ max | 4,640 | 4,660 | 4,840 | 4,860 | 4,840 | 4,840 | 4,650 | 4,500 |
| Tensile @ break | 2,540 | 1,580 | 1,960 | 1,860 | 1,420 | 1,450 | 1,490 | 350(?) |
| Tensile @ yield | 4,640 | 4,660 | 4,840 | 4,860 | 4,840 | 4,840 | 4,650 | 4,500 |
| Tensile modulus | 16,400 | 15,800 | 16,700 | 16,800 | 16,600 | 16,700 | 16,400 | 15,800 |
| Elongation @ yield (%) | 10 | 10 | 10 | 10 | 9.4 | 9.3 | 9.4 | 9.0 |
| Elongation @ break (%) | >500 | >500 | >500 | 480 | >500 | >500 | >500 | >500 |
| Flexural Modulus (psi) | | | | | | | | |
| Flex strength @ yield | 5,890 | 5,830 | 5,900 | 5,900 | 5,860 | 5,870 | 5,900 | — |
| Flex strength @ max | 6,120 | 6,090 | 6,150 | 6,190 | 6,110 | 6,140 | 6,190 | — |
| Tangent Flex. Modulus | 179,000 | 189,000 | 197,000 | 199,000 | 198,000 | 198,000 | 201,000 | 197,000 |

TABLE 5-continued

|  | PP + Carrier | PP | 0.50%* | 1.00%* | 1.50%* | 2.00%* | 2.50%* | 3.00%* |
|---|---|---|---|---|---|---|---|---|
| Notched Izod (ft-lb-in) | | | | | | | | |
| Energy @ 23° C. | 0.62 | 0.64 | 0.54 | 0.53 | 0.50 | 0.53 | 0.53 | 0.52 |
| Energy @ −40° C. | 0.37 | 0.34 | 0.30 | 0.30 | 0.31 | 0.30 | 0.30 | 0.34 |
| Heat deflection temperature (° C.) | | | | | | | | |
| @ 66 psi | 97 | 106 | 103 | 104 | 105 | 106 | 107 | 106 |

*% of NOAG by weight of the composition.

The physical, mechanical, and thermal properties of articles made from the NOAG-resin composition were found to be comparable for varying concentrations of water in the NOAG as shown in Table 6 below. Water is the only potentially volatile component in NOAG that could react with a resin. No significant variation in physical, mechanical or thermal properties as a function of water content teaches that water does not interact or react with the resin.

TABLE 6

|  | PP + Carrier | PP | 100%* | 50%* | 0%* |
|---|---|---|---|---|---|
| Tensile (psi) | | | | | |
| Tensile @ max | 4,640 | 4,660 | 4,860 | 4,770 | 4,730 |
| Tensile @ break | 2,540 | 1,580 | 1,860 | 1,580 | 2,000 |
| Tensile @ yield | 4,640 | 4,660 | 4,860 | 4,770 | 4,730 |
| Tensile modulus | 16,400 | 15,800 | 16,800 | 16,600 | 16,300 |
| Elongation @ yield (%) | 10 | 10 | 10 | 10 | 9.9 |
| Elongation @ break (%) | >500 | >500 | 480 | >500 | >500 |
| Flexural Modulus (psi) | | | | | |
| Flex strength @ yield | 5,890 | 5,830 | 5,900 | 6,050 | 6,050 |
| Flex strength @ max | 6,120 | 6,090 | 6,190 | 6,310 | 6,250 |
| Tangent Flex. Modulus | 179,000 | 189,000 | 199,000 | 199,000 | 206,000 |
| Notched Izod (ft-lb/in) | | | | | |
| Energy @ 23° C. | 0.62 | 0.64 | 0.53 | 0.54 | 0.49 |
| Energy @ −40° C. | 0.37 | 0.34 | 0.30 | 0.31 | 0.30 |
| Heat deflection temperature (° C.) | | | | | |
| @ 66 psi | 97 | 106 | 102 | 106 | 108 |

*Amount of water available at typical molding temperature of 500° F. as compared to NOAG as found.

The physical, mechanical, and thermal properties of articles made from the NOAG-resin composition were found to be comparable for various mineral compositions in the NOAG for a NOAG loading of 1% and particle size of less than 325 mesh, as shown in Table 7 below.

TABLE 7

| Composition | PP + Carrier | PP | 95% A 5% B | 50% A 50% B | 9% A 91% B | 86% A 7% B 7% C | 68% A 8% B 24% C |
|---|---|---|---|---|---|---|---|
| Tensile (psi) | | | | | | | |
| Tensile @ max | 4,640 | 4,660 | 4,860 | 4,790 | 4,770 | 4,840 | 4,700 |
| Tensile @ break | 2,540 | 1,580 | 1,860 | 1,650 | 2,930 | 1,960 | 2,200 |
| Tensile @ yield | 4,640 | 4,660 | 4,860 | 4,790 | 4,770 | 4,840 | 4,700 |
| Tensile modulus | 16,400 | 15,800 | 16,800 | 16,600 | 16,400 | 16,600 | 16,200 |
| Elongation @ Yield (%) | 10 | 10 | 10 | 9.6 | 9.5 | 9.9 | 9.8 |
| Elongation @ Break (%) | >500 | >500 | 480 | >500 | >500 | >500 | >500 |

TABLE 7-continued

| Composition | PP + Carrier | PP | 95% A 5% B | 50% A 50% B | 9% A 91% B | 86% A 7% B 7% C | 68% A 8% B 24% C |
|---|---|---|---|---|---|---|---|
| Flexural Modulus (psi) | | | | | | | |
| Flex strength @ yield | 5,890 | 5,830 | 5,900 | 6,140 | 6,020 | 6,020 | 5,900 |
| Flex strength @ max | 6,120 | 6,090 | 6,190 | 6,410 | 6,350 | 6,290 | 6,160 |
| Tangent Flex. Modulus | 179,000 | 189,000 | 199,000 | 185,000 | 194,000 | 193,000 | 189,000 |
| Notched Izod (ft-lb/in) | | | | | | | |
| Energy @ 23° C. | 0.62 | 0.64 | 0.53 | 0.53 | 0.53 | 0.50 | 0.58 |
| Energy @ −40° C. | 0.37 | 0.34 | 0.30 | 0.32 | 0.31 | 0.35 | 0.36 |
| Heat deflection temperature (° C.) | | | | | | | |
| @ 66 psi | 97 | 106 | 104 | 101 | 105 | 105 | 104 |

A NOAG
B Crystalline silicates
C Clay minerals

An absence of differences in physical, mechanical and thermal properties between virgin resin and the NOAG-thermoplastic resin compositions is consistent with the conclusion that there is an absence of chemical interaction or reaction between the NOAG and a thermoplastic resin.

The inventors observed that molded parts consisting of the NOAG-thermoplastic resin composition could be ground and remolded under the same operating parameters.

Detailed analysis of the NOAG-thermoplastic resin indicate that compounding and molding of the NOAG-resin composition do not alter or degrade the resin. For example, the $C^{13}$ nuclear magnetic resonance spectroscopic analysis of the resin before and after molding (curve 61 and curve 59, FIG. 14) with NOAG are virtually identical. The similarity of spectra indicates that NOAG does not degrade the resin; if it did, decomposition products with different $C^{13}$ spectra should have been detected. Their absence indicates no detectable degradation of the resin. Similarly, differential scanning calorimetry analysis indicate that the crystal structure and abundance in PP is indistinguishable from PP molded with 0.5 and 1.0 weight of NOAG (curves 67, 65, and 63 in FIG. 15).

In spite of careful and multi-directional research, the inventors have not been able to detect any discernable change in the base resin composition or structure. Yet, the NOAG-resin composition has important and significant behavioral properties in the thermoplastic molding environment.

Benefits of Using NOAG in a Thermoplastic Molding Process

The benefits of using the new NOAG-thermoplastic resin composition in a thermoplastic molding process that the inventors have to date identified are:
A. Higher productivity because of:
 1. Reduced cycle time—combination of reduced cure time, fill time, pack and hold time.
 2. Increased line speeds—extruder revolutions per minute and feet per minute output.
 3. De-molding enhancement articles release more easily from the mold surface.
 4. Continuous purging and cleaning.
B. Lower power usage per part because of:
 1. Reduced heater demand in barrel and screw.
 2. Reduced screw speed.
 3. Reduced injection pressure.
 4. Less force needed to achieve desired injection speed.
 5. Significant reduction in cure and cycle time.
C. Reduced wear on equipment because of:
 1. Lower operating temperatures.
 2. Lower operating pressures.
 3. Reduced screw and injection speeds.

Benefits of Using NOAG-Thermoplastic Resin to Make Products

The articles manufactured from the NOAG-thermoplastic resin composition experience considerable benefits:
A. Improved fill in complex tooling geometries allowing molding of more complex articles.
B. Smoother surface finishes.
C. Reduced sink marks.
D. Improved dispersion of additives and pigments.
E. Reduced degradation of polymer due to lower operating temperatures.

These improvements to the manufactured article come with the additional advantage that the article experiences no loss of physical, mechanical or thermal properties as compared to one made from virgin resin.

Advantages to the User of NOAG-Thermoplastic Compositions

A manufacturer who molds plastic parts will see the following advantages to using NOAG-thermoplastic resin composition because of:
A. Lowered manufacturing costs—higher profits.
 1. Higher productivity, increased parts/hour, higher profitability.
 2. Increased capacity.
 3. Reduced energy consumption per part manufactured.
 4. Reduced mold release agents used.
 5. Reduced down time for purging, cleaning, and maintenance.
B. Non-specific thermoplastic resin response.
 1. All benefits of the NOAG-resin composition are affective across the thermoplastic range of resin types.
 2. No loss of physical, mechanical or thermal properties in all resins tested.
 3. No detectable polymer degradation products detectable by $H^1$ and $C^{13}$ NMR spectroscopy and DSC spectrometry.

C. Wide Selection Of Molding Processes.

Injection, extrusion, blow, extrusion blow, injection blow, blow film extrusion, calendaring, thermoforming, casting and expansion processes can use the NOAG-thermoplastic resin composition to make goods.

What is claimed is:

1. A composition comprising a thermoplastic resin; and a predominately vitreous, naturally occurring formulation:

Silicon Dioxide ($SiO_2$)—about 73.0%,

Aluminum Oxide ($Al_2O_3$) and other oxides and trace minerals each less than about 5.0%, the formulation being in a quantity of less than about 2% by weight of the composition.

2. The composition of claim 1, the predominately vitreous formulation being in a quantity greater than about 0.5% by weight of the composition.

3. The composition of claim 1, the predominately vitreous formulation being predominantly in a particle size range below about 75 microns.

4. The composition of claim 1 further comprising a carrier for the predominately vitreous formulation.

5. The composition of claim 4, the carrier and the predominately vitreous formulation being in pellet form before dispersion within the composition.

6. The composition of claim 5, the formulation being predominantly in a particle size range below about 75 microns.

7. An article of manufacture made from a composition comprising a thermoplastic resin; and a predominately vitreous material comprising silicon dioxide and aluminum oxide uniformly dispersed throughout the composition, the material comorisina silicon dioxide and aluminum oxide being in a quantity of less than about 2% by weight of the composition to improve flow in the formation of the article.

8. The article of manufacture of claim 7 the predominately vitreous material comprising silicon dioxide and aluminum oxide being in a quantity greater than about 0.5% by weight of the composition.

9. The article of manufacture of claim 7, the predominately vitreous material comorisina silicon dioxide and aluminum oxide being predominantly in a particle size range below about 75 microns.

10. The article of manufacture of claim 7 further comprising a carrier for the predominately vitreous material comprising silicon dioxide and aluminum oxide.

11. The article of manufacture of claim 10, the predominately vitreous material comprising silicon dioxide and aluminum oxide being in pellet form with the carrier before dispersion within the composition.

12. The article of manufacture of claim 11, the predominately vitreous material comprising silicon dioxide and aluminum oxide being predominantly in a particle size range below about 75 microns.

13. A method for forming articles, comprising selecting a thermoplastic resin;

dispersing a predominately vitreous material comprising silicon dioxide and aluminum oxide uniformly throughout the selected thermoplastic resin to form a composition, the material comprising silicon dioxide and aluminum oxide being in a quantity of less than about 2% by weight of the composition to improve flow in the formation of the articles; and forming articles by flowing the composition under elevated temperature and pressure.

14. The method of claim 13, the thermoplastic resin being selected from a group consisting of polyethylene, polyvinyl chloride, polypropylene, polystyrene, polyethylene terephthalate, acronytril butadiene styrene, polymethyl methacrylate, polyamide or polycarbonate.

15. The method of claim 13, the predominately vitreous material comprising silicon dioxide and aluminum oxide being in a quantity of greater than about 0.5% by weight of the composition.

16. The method of claim 13, the predominately vitreous material comprising silicon dioxide and aluminum oxide being predominantly in a particle size range below about 75 microns.

17. The method of claim 13, the predominately vitreous material comprising silicon dioxide and aluminum oxide is dispersed in pellet form with a carrier.

18. The method of claim 17, the material comprising silicon dioxide and aluminum oxide is dispersed in a predominant particle size range below about 75 microns.

19. The method of claim 13, the material comprising silicon dioxide and aluminum oxide dispersed being naturally occurring.

20. A composition for the formation of articles, comprising a thermoplastic resin; and a predominately vitreous material comprising silicon dioxide and aluminum oxide uniformly dispersed throughout the composition, the material being in a quantity of less than about 2% by weight of the composition to improve flow in the formation of the articles.

21. The composition of claim 20 therein the predominately vitreous material is in a quantity greater than about 0.5% by weight of the composition.

22. The composition of claim 20 further comprising a carrier for the predominately vitreous material.

23. The composition of claim 22, the predominately vitreous material being in pellet form with the carrier before dispersion within the composition.

24. The composition of claim 20, the predominately vitreous material being predominantly in a particle size range below about 75 microns.

25. The composition of claim 20, the predominately vitreous material being naturally occurring.

26. The composition of claim 20, the thermoplastic resin being selected from a group consisting of polyethylene, polyvinyl chloride, polypropylene, polystyrene, polyethylene terephthalate, acronytril butadiene styrene, polymethyl methacrylate, polyamide or polycarbonate.

* * * * *

UNITED STATES PATENT AND TRADEMARK OFFICE
CERTIFICATE OF CORRECTION

PATENT NO. : 6,921,789 B2
DATED : July 26, 2005
INVENTOR(S) : Jess R. Booth et al.

It is certified that error appears in the above-identified patent and that said Letters Patent is hereby corrected as shown below:

Column 19,
Lines 38 and 47, delete "comorisina" and insert -- comprising -- therefor.

Signed and Sealed this

Twenty-fifth Day of October, 2005

JON W. DUDAS
*Director of the United States Patent and Trademark Office*